(12) United States Patent
Kamamori et al.

(10) Patent No.: US 12,363,127 B2
(45) Date of Patent: Jul. 15, 2025

(54) INFORMATION PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventors: Yuki Kamamori, Kanagawa (JP); Hiromu Furukawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 806 days.

(21) Appl. No.: 17/467,669

(22) Filed: Sep. 7, 2021

(65) Prior Publication Data

US 2022/0086168 A1 Mar. 17, 2022

(30) Foreign Application Priority Data

Sep. 11, 2020 (JP) .................................. 2020-153175
Aug. 24, 2021 (JP) .................................. 2021-136656

(51) Int. Cl.
*G06F 21/00* (2013.01)
*H04L 9/40* (2022.01)
*H04L 67/52* (2022.01)

(52) U.S. Cl.
CPC ............ *H04L 63/107* (2013.01); *H04L 67/52* (2022.05)

(58) Field of Classification Search
CPC ....... H04L 63/107; H04L 67/52; H04L 67/02; H04L 67/10; H04L 63/083; H04L 63/1441; H04L 63/126; H04W 12/63
See application file for complete search history.

(56) References Cited

U.S. PATENT DOCUMENTS

| | | | |
|---|---|---|---|
| 11,044,245 B2 | 6/2021 | Yamanakajima | |
| 2002/0165969 A1* | 11/2002 | Gallant | H04M 15/63 709/227 |
| 2018/0167412 A1* | 6/2018 | Barrett | H04L 63/1491 |
| 2020/0151358 A1* | 5/2020 | Czajka | H04L 67/12 |
| 2021/0067553 A1* | 3/2021 | Ries | H04L 63/1491 |

FOREIGN PATENT DOCUMENTS

JP 2019101668 A 6/2019

* cited by examiner

*Primary Examiner* — Ghazal B Shehni
(74) *Attorney, Agent, or Firm* — ROSSI, KIMMS & McDOWELL LLP

(57) ABSTRACT

The present invention provides an information processing apparatus operable to send, to a client, region information in response to a region specifying request received from the client via the Internet, wherein the apparatus comprises a managing unit which manages mapping information in which user information and region information are associated, a collation unit which, in a case where a region specifying request is received from a client, collates the mapping information, and a response unit which, in a case where a collation result indicates that corresponding user information is present in the mapping information, sends, to the client, corresponding region information as a response, and in a case where a collation result indicates that corresponding user information is not present in the mapping information, sends, to the client, mendacious region information as a response.

10 Claims, 16 Drawing Sheets

| user_id_hash | region |
|---|---|
| 3fc513c8-dcdd-d3fc-a70f-e4fbb0c6bf6e | US |
| a87dee76-efb0-4a61-b4a5-eb3ea78f39a8 | EU |
| ⋮ | ⋮ |

INFORMATION PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to a response technique for a region specifying request received from a client terminal via the Internet.

Description of the Related Art

In recent years, the use of cloud services deployed on the Internet has been expanding. In cloud services, IT devices such as servers and network devices are aggregated in a facility called a data center, and are installed and operated to provide Web application services to users. Data centers are established for each country or region, and enterprises providing services worldwide deploy the same type of services to multiple data centers as needed.

Data such as a user ID, password, and email address of the user are managed independently for each data center that the user accesses, for personal information protection. Users will decide which data centers to access in accordance with their physical region and legal systems, but the different data centers will have different URLs for accessing service sites deployed in the data centers.

In regards to this point, Japanese Patent Laid-Open No. 2019-101668 discloses a method that enables users to access a service with a common URL by an integrated server specifying a region in which a user is registered and a Web client sending an authentication request to an authentication server in the specified region.

As described above, an integrated server specifies the region in which a user ID is registered and responds with it to a Web client. In the case of an unregistered user ID, the integrated server cannot specify the region, so it returns an error of some kind. If a malicious person accesses the integrated server with a random user ID, they can determine whether or not the user ID that they used is registered based on the content of response from the integrated server. Therefore, a registered user ID being subject to brute force attacks on its password is a security problem.

SUMMARY OF THE INVENTION

The present invention was conceived to solve the above-described problems, and provides a technique for reducing security risk by making it difficult to determine whether or not a user ID is registered by a region specifying response of an integrated server.

According to an aspect of the invention, there is provided an information processing apparatus operable to send, to a client terminal, region information representing a corresponding region in response to a region specifying request received from the client terminal via the Internet, the apparatus comprising: a communication unit configured to communicate with the Internet; a managing unit configured to manage mapping information in which user information and region information are associated; a collation unit configured to, in a case where a region specifying request which includes user information specifying a user is received from a client terminal via the communication unit, collate the mapping information of the managing unit; a response unit configured to, in a case where a collation result of the collation unit indicates that corresponding user information is present in the mapping information, send, to the client terminal, corresponding region information as a response, and in a case where a collation result of the collation unit indicates that corresponding user information is not present in the mapping information, send, to the client terminal, mendacious region information as a response.

According to the present invention, it becomes possible to reduce security risk by functioning as an integrated server that manages a user ID and mapping information of a region and making it difficult to determine whether or not the user ID is registered at a request source of a region specifying request.

Further features of the present invention will become apparent from the following description of exemplary embodiments with reference to the attached drawings.

DESCRIPTION OF THE EMBODIMENTS

Figure 1:
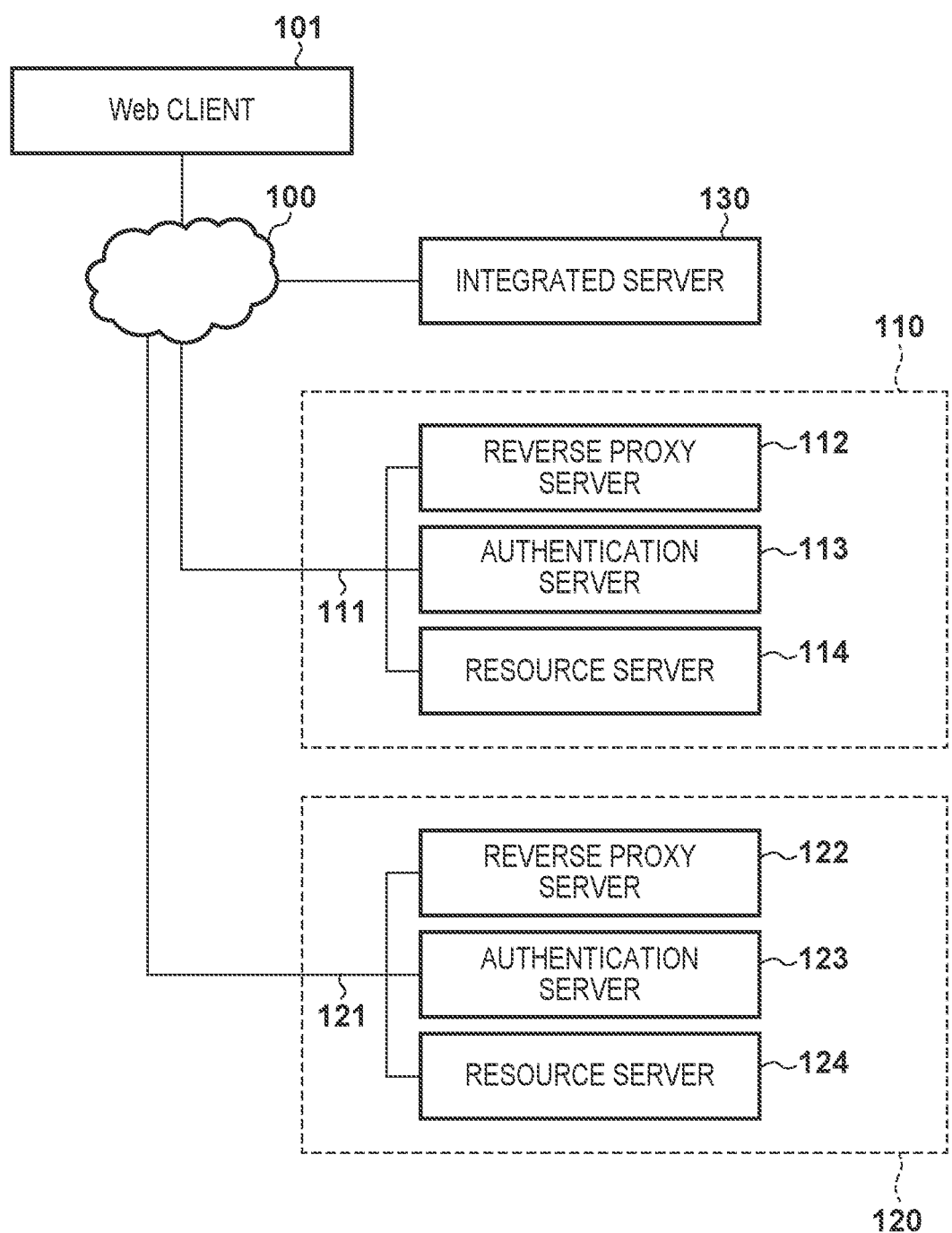
FIG. 1 is a diagram illustrating a network configuration of an information processing system in a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An example of a network configuration of an information processing system according to the present embodiment will be described with reference to the block diagram of FIG. 1.

The system includes a Web client 101, an integrated server 130, and data centers 110 and 120 connected to the Internet 100. The Web client 101 is a client terminal equipped with a Web browser function and can utilize Web techniques such as cookies. The data centers 110 and 120 are independent of each other. In the embodiment, for convenience, the data centers will be distinguished by distinguished names based on the regions in which the data centers are set up, and hereinafter, the data center 110 will be referred to as the US region and the data center 120 will be referred to as the EU region.

A reverse proxy server 112, an authentication server 113, and a resource server 114 are connected to a computer network 111 in the US region 110. A reverse proxy server 122, an authentication server 123, and a resource server 124 are connected to a computer network 121 in the EU region 120. Note that a region is a term indicating a certain range such as a country or a region, and the range of the region is not limited. The same server configurations are established in the US region 110 and the EU region 120. The reverse proxy servers 112 and 122 are responsible for distributing access requests from external units to servers within the network. For example, a reverse proxy server determines whether to perform distribution to an authentication server or to a resource server from the path name of a URL. The reverse proxy servers 112 and 122 are each assigned a different, region-specific domain name, and the domain names of the URLs are different. Therefore, accesses are separated for each region. An access from the Web client 101 to the reverse proxy server 112 is distributed to the authentication server 113 and the resource server 114. Meanwhile, an access from the Web client 101 to the reverse proxy server 122 is distributed to the authentication server 123 and the resource server 124. Also, reverse proxy servers 112 and 122 receive access requests. Therefore, the domain names and domains of the authentication server 113 and the resource server 114 are the same, and similarly, the domain names and domains of the authentication server 123 and the resource server 124 are the same. Authentication servers 113 and 123 authenticate requests from the Web client 101. The resource server 114 provides a Web application service in response to authentication by the authentication server 113. Also, the resource server 124 provides a Web application service in response to authentication by the authentication server 123.

The integrated server 130 is a server capable of communicating with the Web client 101 and provided to accept URLs that are common worldwide. The integrated server 130 may be disposed in a data center separate from the US region 110 or the EU region 120, or in the US region 110 or the EU region 120. Further, integrated servers may be disposed in a plurality of data centers and common URLs may be assigned using a GeoDNS (not illustrated). A GeoDNS is a mechanism for forwarding requests to a server that is close, in terms of network, from a client requesting access. For example, if the Web client 101 requests access to the common URL of an integrated server and the location of the Web client 101 is close to the US region 110 in a network, the request is forwarded to the integrated server 130 disposed in the US region 110.

Figure 2:
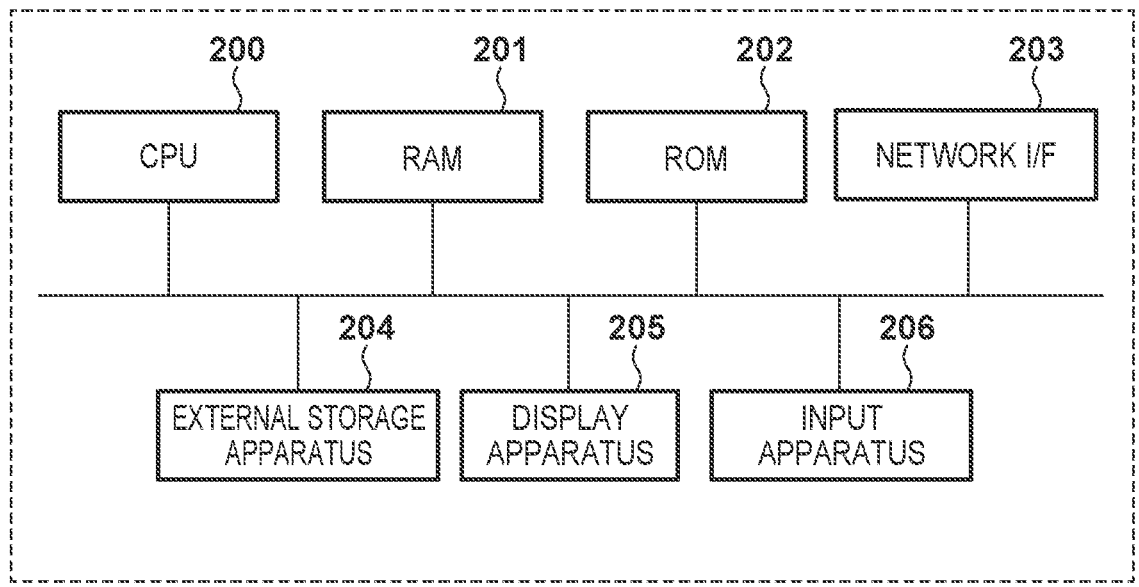
FIG. 2 is a block diagram illustrating an example of a hardware configuration of an information processing apparatus in the first embodiment.

The Web client 101 and various servers have a basic configuration as an information processing apparatus. FIG. 2 illustrates a hardware configuration of an information processing apparatus.

The information processing apparatus includes a CPU 200, a RAM 201, a ROM 202, a network interface 203, an external storage apparatus 204, a display apparatus 205, and an input apparatus 206.

The CPU 200 performs the operation control of each unit of the information processing apparatus and executes various kinds of processing to be described later as performed by the information processing apparatus. The RAM 201 is a memory for temporarily storing data and control information, and is a work area used for when the CPU 200 executes various kinds of processing. The ROM 202 stores fixed operation parameters, operation programs of the information processing apparatus, and the like.

The network interface 203 provides functions for connecting and communicating with the Internet 100 and the computer networks 111 and 121. The information processing apparatus can send and receive data to and from external apparatuses via the network interface 203.

The external storage apparatus 204 is an apparatus for storing data and has an interface for accepting I/O commands for reading and writing data. The external storage apparatus 204 may be a hard disk drive (HDD), a solid-state drive (SSD), an optical disc drive, a semiconductor storage apparatus, or another storage apparatus. The external storage apparatus 204 stores a computer program and data for causing the CPU 200 to execute each process to be described later as performed by the information processing apparatus.

The display apparatus 205 is, for example, an LCD (Liquid Crystal Display) or the like, and displays necessary information to a user. The input apparatus 206 is, for example, a keyboard, a mouse, a touch panel, or the like, and receives necessary input from a user. The display apparatus 205 and the input apparatus 206 constitute a user interface.

The Web client 101 and the various servers (112 to 114, 122 to 124, and 130) have the basic configuration of FIG. 2 as described above, but may have a unique configuration that accords with the usage pattern of the apparatus. For example, the Web client 101, if it is a smartphone, will have a configuration of an imaging sensor and a line connection in addition to the configuration of FIG. 2. However, the description of a specific configuration, since it deviates from the essence of the present embodiment, will be is omitted here.

Figure 3:
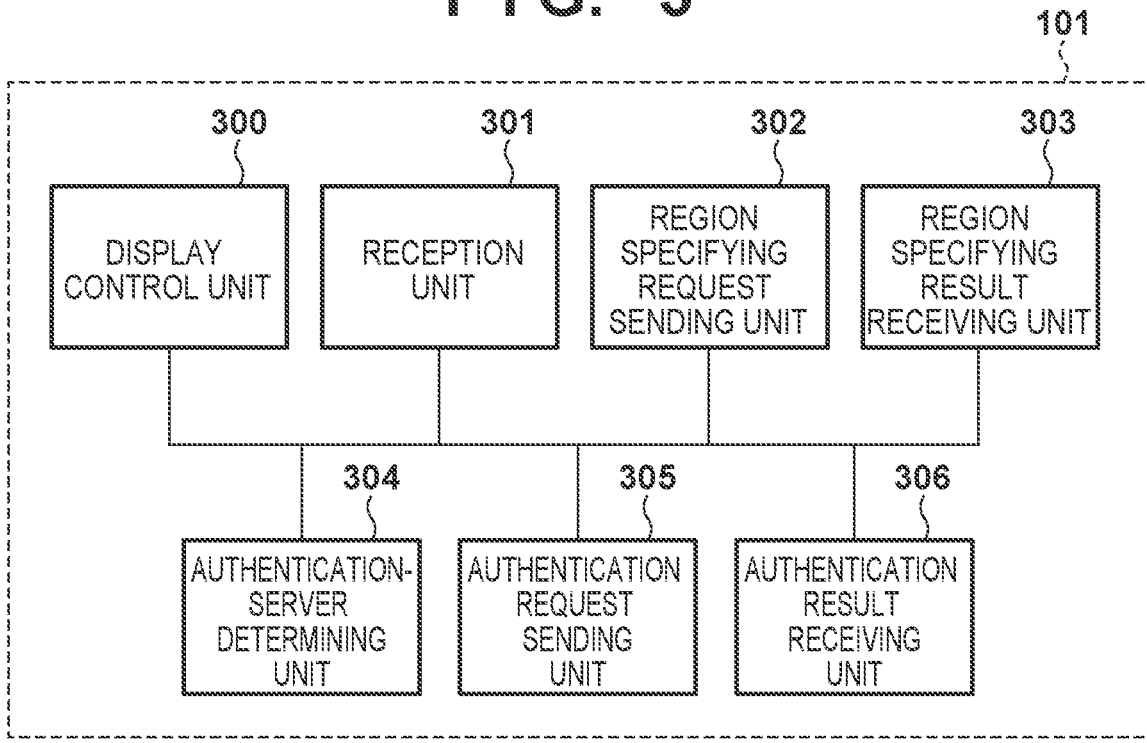
FIG. 3 is a block diagram illustrating a functional configuration of a Web client in the first embodiment.

Next, a functional configuration of the Web client 101 according to the present embodiment will be described with reference to the block diagram of FIG. 3. The configuration illustrated in FIG. 3 represents a functional configuration for a case where the CPU 200 of the Web client 101 executes a program as a Web client.

The Web client 101 includes a display control unit 300, a reception unit 301, a region specifying request sending unit 302, a region specifying result receiving unit 303, an authentication-server determining unit 304, an authentication request sending unit 305, and an authentication result receiving unit 306. For descriptive convenience, it is assumed that the hardware of the Web client 101 has the configuration of FIG. 2.

The display control unit 300 displays a login screen on the display apparatus 205. In addition, the display control unit 300 displays a login success screen and a login failure screen on the display apparatus 205 in accordance with an authentication result to be described later.

The reception unit 301 accepts input of a user ID and a password from the input apparatus 206 for the login screen displayed by the display control unit 300.

The region specifying request sending unit 302 sends to the integrated server 130 a region specifying request including the user ID received by the reception unit 301 as user information.

The region specifying result receiving unit 303 receives a region specifying result sent from the integrated server 130.

The authentication-server determining unit 304 determines based on the region received by the region specifying result receiving unit 303 the authentication server to be sent an authentication request.

The authentication request sending unit 305 sends to the authentication server determined by the authentication-server determining unit 304 an authentication request based on the user ID and password received by the reception unit 301.

The authentication result receiving unit 306 receives an authentication result sent from the authentication server.

Figure 4:
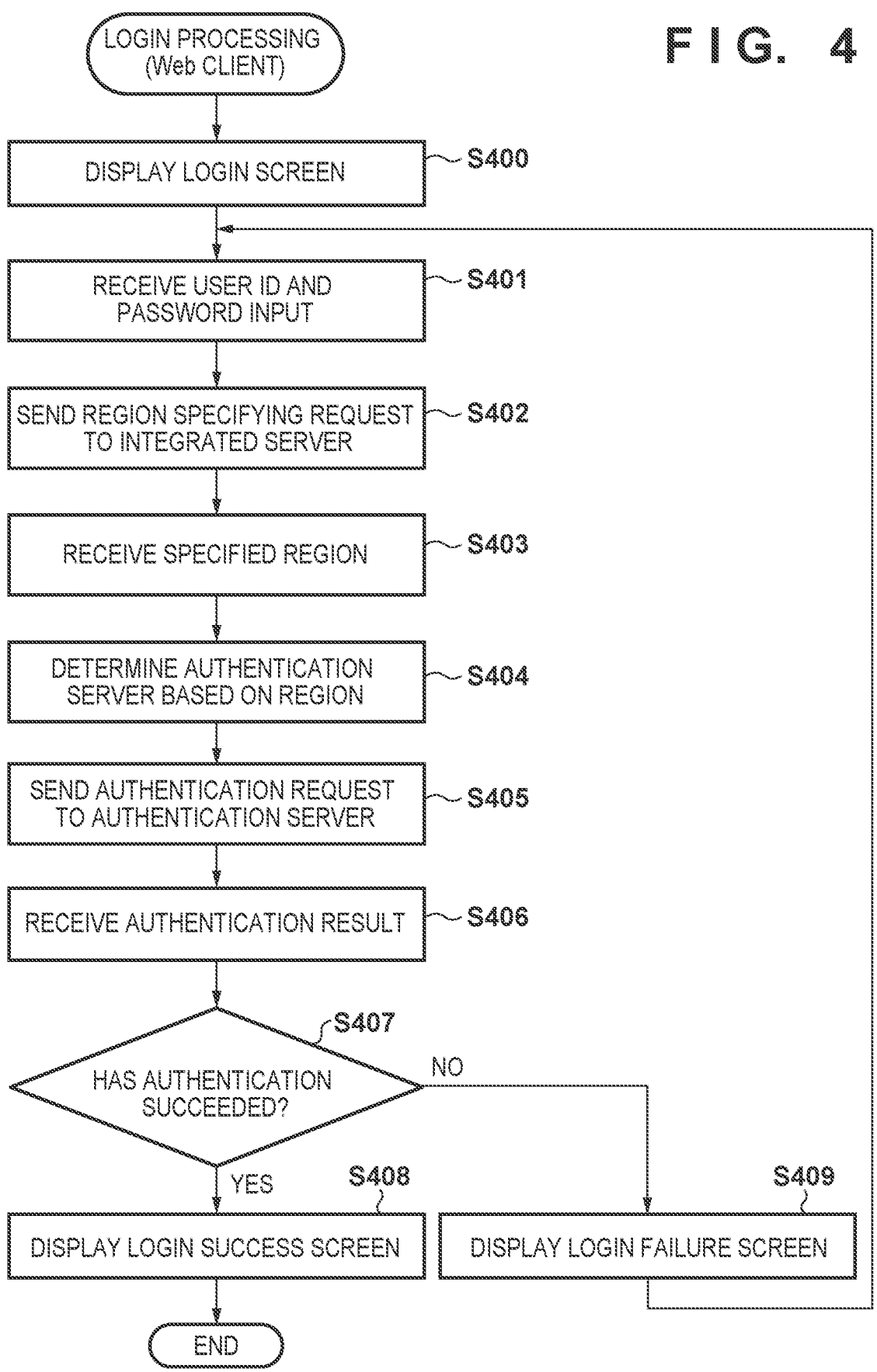
FIG. 4 is a flowchart illustrating an operation at the time of login processing of the Web client in the first embodiment.

Next, a processing procedure at the time of login processing of the Web client 101 according to the present embodiment will be described with reference to the flowchart of FIG. 4.

Figure 5:
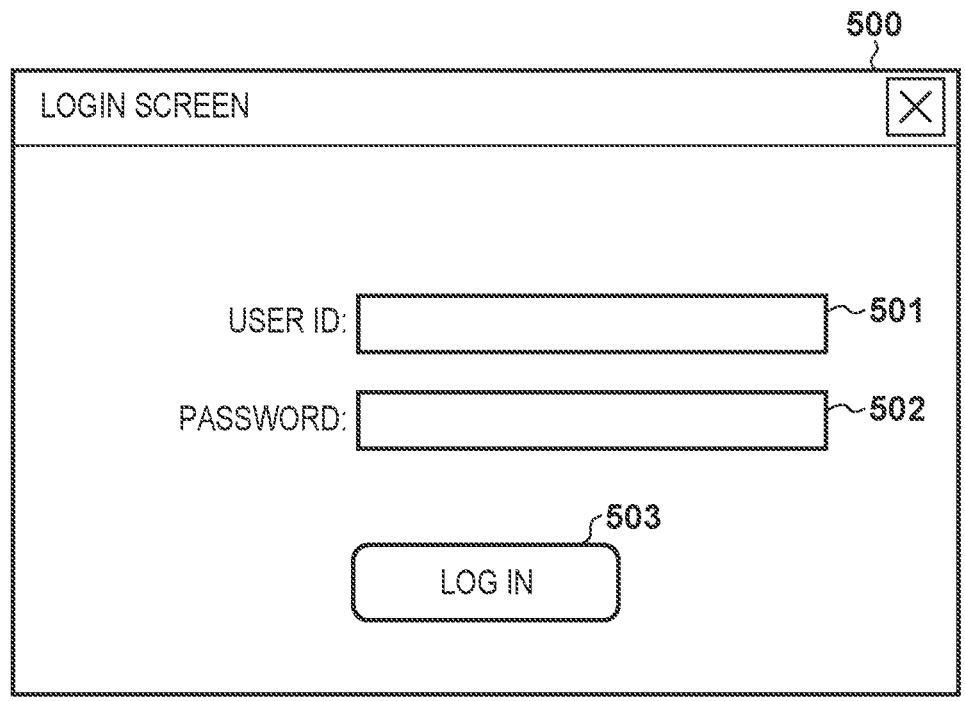
FIG. 5 is a diagram illustrating an example of a login screen in the first embodiment.

First, in step S400, the display control unit 300 acquires a login screen from the integrated server 130, and displays it on the display apparatus 205. An example of the login screen displayed is illustrated in FIG. 5. A login screen 500 includes a user ID input field 501, a password input field 502, and a button 503 for the user to confirm the inputted information. The login screen is not limited to acquisition from the integrated server 130, and may be acquired from the external storage apparatus 204, for example.

Next, in step S401, the reception unit 301 receives an input of the user ID and the password for the login screen from the user (step S401). Here, the user uses the input apparatus 206 to input a user ID in the user ID input field 501 and a password in the password input field 502 of the login screen 500, and confirms the input by pressing the button 503.

In response to the confirmation of the input of the user ID and the password, the region specifying request sending unit 302 sends a region specifying request to the integrated server 130 in step S402. Here, the region specifying request includes at least the user ID received by the reception unit 301. The integrated server 130 specifies the region in which the user ID is registered based on the received region specifying request and responds with it to the Web client 101. The region specifying processing by the integrated server 130 will be described later.

In step S403, the region specifying result receiving unit 303 receives a region specifying result from the integrated server 130.

Next, in step S404, the authentication-server determining unit 304 determines based on the received region specifying result the authentication server to be a target of sending the authentication request. For example, if the region specified as that to which the user ID is registered is the US region 110, the authentication-server determining unit 304 determines the authentication server 113 of the US region 110 to be a target of sending the authentication request. Similarly, if the region specified as that to which the user ID is registered is the EU region 120, the authentication-server determining unit 304 determines the authentication server 123 of the EU region 120 to be a target of sending the authentication request.

In step S405, the authentication request sending unit 305 sends an authentication request to the authentication server determined to be a sending target. The authentication request includes at least the user ID and the password received by the reception unit 301. If the authentication server 113 of the US region 110 is determined to be a target of sending the authentication request, the URL specified at the time of sending will be a URL having a domain name unique to the US region 110. Also, if the authentication server 123 in the EU region 120 is determined to be a target of sending the authentication request, the URL will have a domain name unique to the EU region 120. The authentication server authenticates the user based on the user ID and password included in the received authentication request, and responds with an authentication result to the Web client 101 that is the request source.

In step S406, the authentication result receiving unit 306 receives the authentication result sent from the authentication server. Then, in step S407, the authentication result receiving unit 306 determines whether the received authentication result is a "success" or a "failure". If it is successful (if step S407 is YES), the display control unit 300 displays a login success screen on the display apparatus 205 in step S408 (step S408). The response from the authentication server includes an instruction to set an authentication token in a cookie. On the other hand, if the authentication result is a "failure" (if NO in step S407), the display control unit 300 displays a login failure screen on the display apparatus 205 in step S409.

Figure 6:
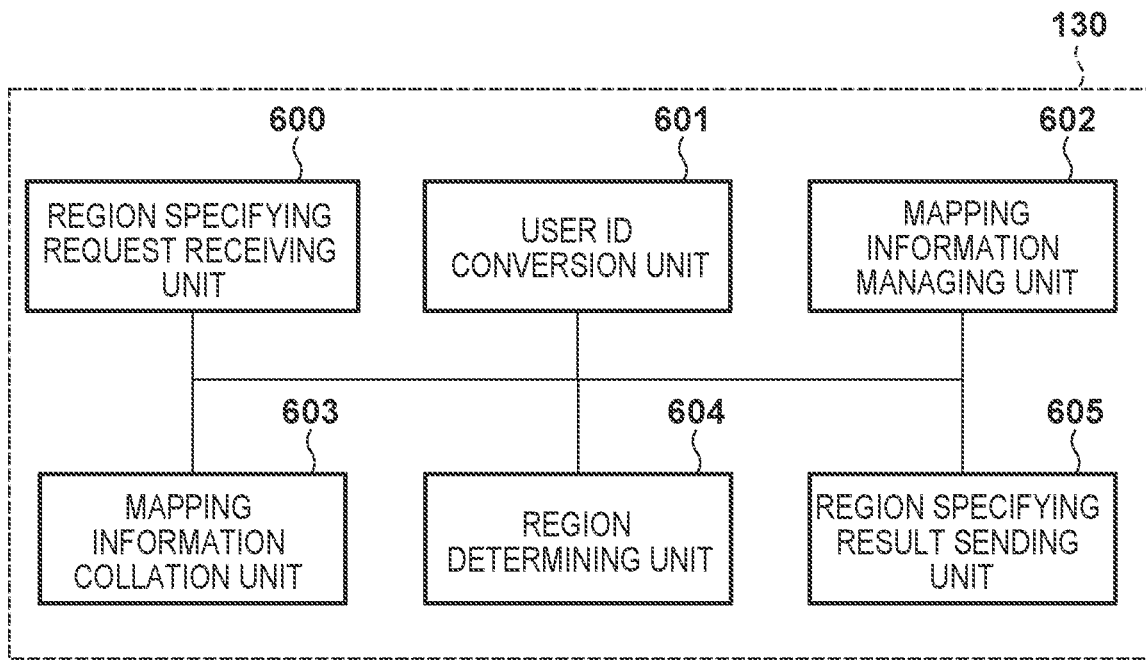
FIG. 6 is a block diagram illustrating a functional configuration of an integrated server in the first embodiment.

Next, a functional configuration of the integrated server 130 according to the present embodiment will be described with reference to the block diagram of FIG. 6. The configuration illustrated in FIG. 6 represents a functional configuration for a case where the CPU 200 of the integrated server 130 executes a program for functioning as an integrated server. For descriptive convenience, it is assumed that the hardware of the integrated server 130 has the configuration of FIG. 2.

The integrated server 130 includes a region specifying request receiving unit 600, a user ID conversion unit 601, a mapping information managing unit 602, a mapping information collation unit 603, a region determining unit 604, and a region specifying result sending unit 605.

The region specifying request receiving unit 600 receives a region specifying request sent from the Web client 101 via the network interface 203.

The user ID conversion unit 601 converts the user ID included in the region specifying request to a hash value.

The mapping information managing unit 602 stores and holds in the external storage apparatus 204 and manages the hash values of user IDs registered in each region and the mapping information of the regions in which the corresponding users are registered. The hash values of the user IDs are stored in order to protect the user IDs which can be personal information.

The mapping information collation unit 603 collates (or searches) in the mapping information managing unit 602 using the hash value of the user ID calculated by the user ID conversion unit as a key, determines whether or not it is present (a collation result), and if it is present, specifies the corresponding region.

The region determining unit 604 determines a mendacious region based on the user ID included in the region specifying request.

The region specifying result sending unit 605 sends region information representing either the region specified by the mapping information collation unit 603 or the mendacious region determined by the region determining unit 604 to the Web client 101 via the network interface 203 as a region specifying result.

Figure 7:
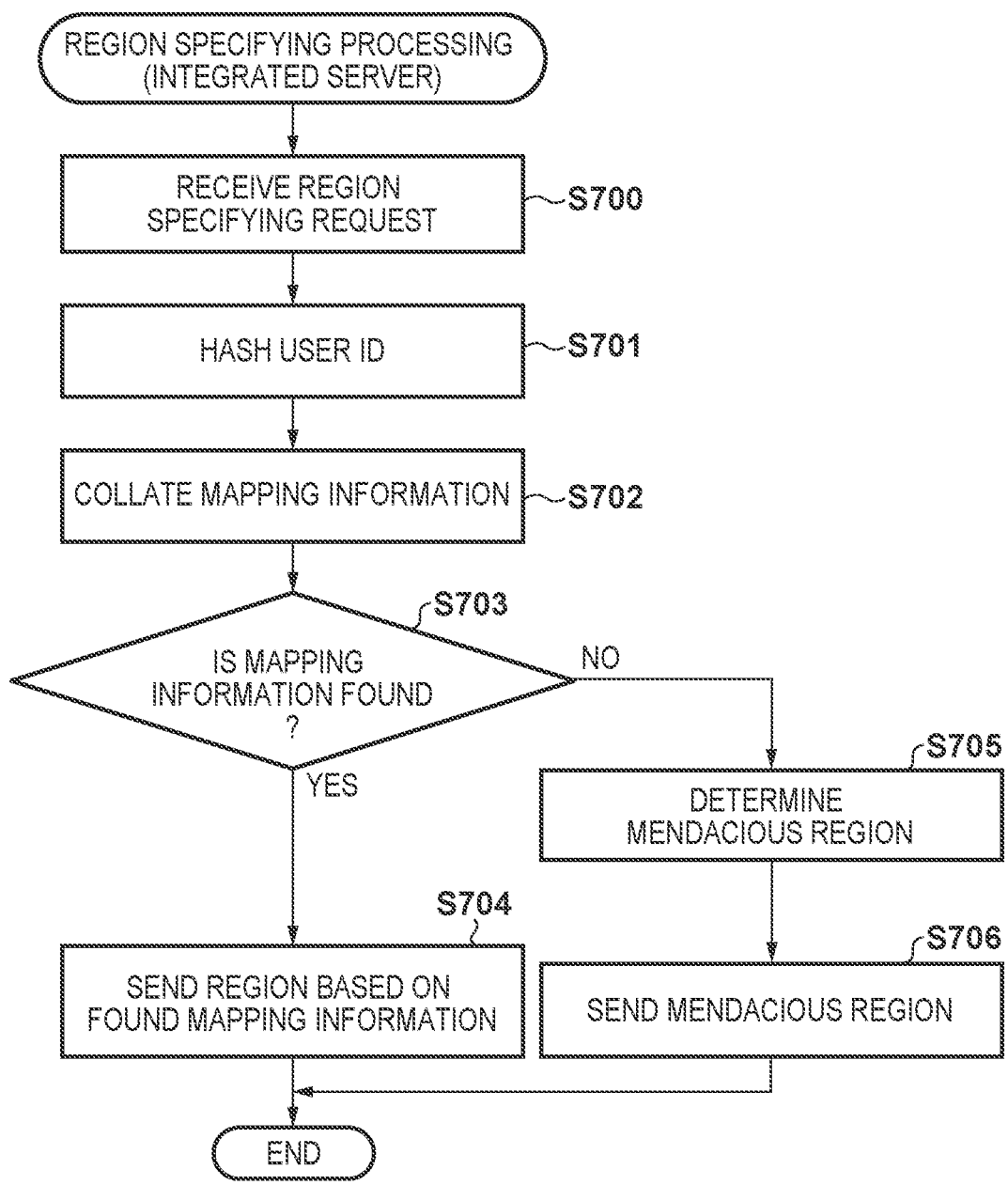
FIG. 7 is a flowchart illustrating an operation at the time of region specifying processing of the integrated server in the first embodiment.

Next, region specifying processing of the integrated server 130 according to the present embodiment will be described with reference to the flowchart of FIG. 7.

First, in step S700, the region specifying request receiving unit 600 receives a region specifying request sent from the Web client 101. Then, in step S701, the user ID conversion unit 601 calculates the hash value of the user ID included in the received region specifying request.

Next, in step S702, the mapping information collation unit 603 collates mapping information of a region from the mapping information managing unit 602 based on the hash value of the user ID obtained in step S701.

Figures 8, 9:
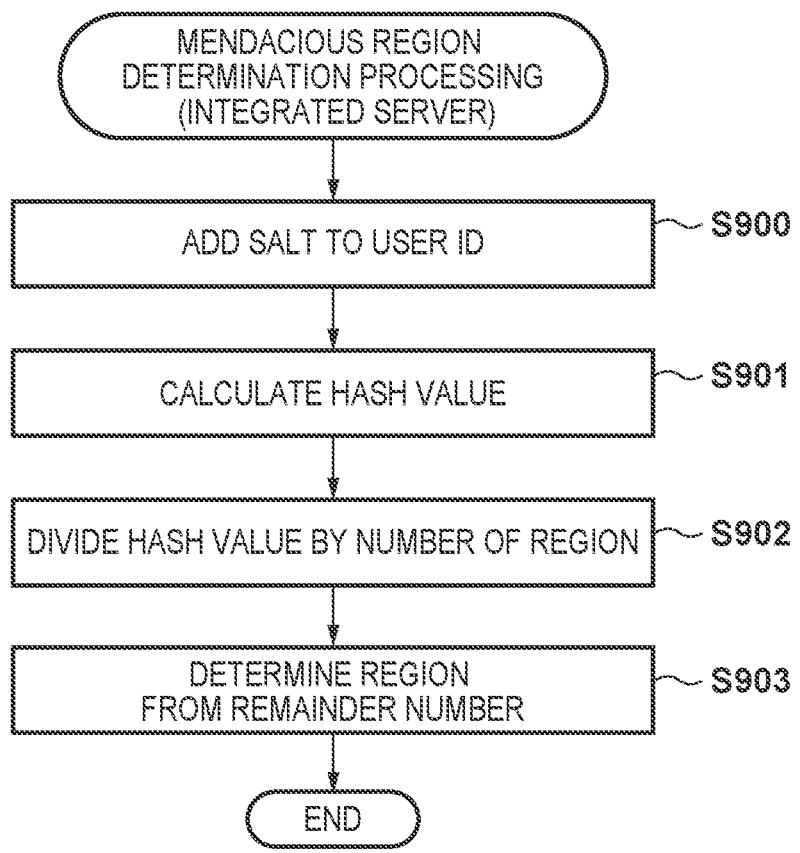
FIG. 8 is a diagram illustrating an example of a hash value of a user ID and mapping information of a region.
FIG. 9 is a flowchart illustrating an operation at the time of mendacious region determination processing of the integrated server in the first embodiment.

FIG. 8 illustrates an example of the hash values of user IDs and the mapping information of regions managed by the mapping information managing unit 602. "user id hash" of the first field are the hash values of user IDs, and "region" of the second field are the regions in which the users are registered. As described above, user IDs are managed by hashing because user IDs may correspond to personal information.

In step S703, the mapping information collation unit 603 determines whether or not a hash value that matches the hash value obtained by the calculation in step S701 is present in the mapping information. In other words, the mapping information collation unit 603 determines whether or not the user ID is registered.

If a matching hash value is found (step S703 is YES), the region specifying result sending unit 605 sends the region associated with the matching hash value to the Web client 101 as a region specifying result in step S704.

On the other hand, if the mapping information is not found (NO in step S703), the region determining unit 604 determines a mendacious region in step S705. Then, in step S706, the region specifying result sending unit 605 sends a mendacious region to the Web client 101 as a region specifying result.

Here, a method of determining a mendacious region in step S705 will be described with reference to the flowchart of FIG. 9.

First, in step S900, the region determining unit 604 assigns a salt (a predetermined value or a predetermined character string) to the user ID included in a region specifying request. In step S901, the region determining unit 604 calculates, as a hash value, the output of the hash function in which that added character string is an input. In step S902, the region determining unit 604 considers the hash value obtained by the calculation as a numeric value, divides it by the total number of regions, and obtains a remainder value. Next, in step S903, the region determining unit 604 determines the region corresponding to the remainder value as a mendacious region.

For example, in the present embodiment, the total number of regions is 2, and if the remainder value is 0, the US region is determined as a mendacious region, and if the remainder value is 1, the EU region is determined as a mendacious region. Thus, a mendacious region is uniquely determined from the user ID, so that even if a region specifying request is sent multiple times for the same user ID, it is responded with the same region specifying result every time. Therefore, it is possible to make it difficult to determine whether or not the user ID is registered in a particular region.

Note that the method of uniquely determining a mendacious region from a user ID is not limited to this, and for example, the addition of a salt in step S900 may be omitted, or the hash value of the user ID calculated in step S701 may be used instead of calculating the hash value in step S901. Further, if the user ID is registered in any of the regions, the region specifying result with which the integrated server 130 responds is changed from a mendacious region to a true region before and after the registration, so the region in which the user ID is registered may be determined based on this change. To solve this, algorithms for calculating salts, hash functions, and hash values may be changed periodically for some or all user IDs.

As described above, the integrated server 130 of the present embodiment responds to a region specifying request for a user ID that is not registered in any of the regions with a mendacious region that is uniquely determined from the user ID. Therefore, it is possible to make it difficult for the user of a request source (Web client) to distinguish by a region specifying request whether or not the user ID is registered.

In the present embodiment, the integrated server 130 sends the region in which the user ID is registered as a region specifying result, and the Web client 101 determines an authentication server from the region, but the present invention is not limited to this. For example, the integrated server 130 may send a URL and a domain for accessing the authentication server of the region where the user ID is registered as a region specifying result. This makes it possible to omit the authentication server determination processing by the Web client 101 and to control a destination of sending the authentication request by the integrated server 130.

In addition, although in the present embodiment the region in which the user is registered is specified, the present invention is not limited to this. For example, the region in which a device or client service is registered may be specified to determine the authentication/authorization server of the device or client service. In addition, in order to control the authentication target of the authentication request sent by the Web client, the organization or realm in which the user is registered may be specified.

Second Embodiment

In the above-described first embodiment, a method of determining a mendacious region that is uniquely determined every time a region specifying request is received in the region specifying processing by the integrated server 130 has been described.

In the second embodiment, an example of responding with the same region specifying result every time even if a region specifying request is sent multiple times for the same user ID will be described. In the second embodiment, an example will be described in which the integrated server 130 uses mapping information for mendacious use in which a user ID and mendacious region information are associated, in addition to the mapping information described in the first embodiment. Note that description will be omitted for the example of the network configuration, the example of the hardware configuration, the example of the functional configuration, and the login processing by the Web client 101 since they are the same as those in the first embodiment.

Figures 10, 11:
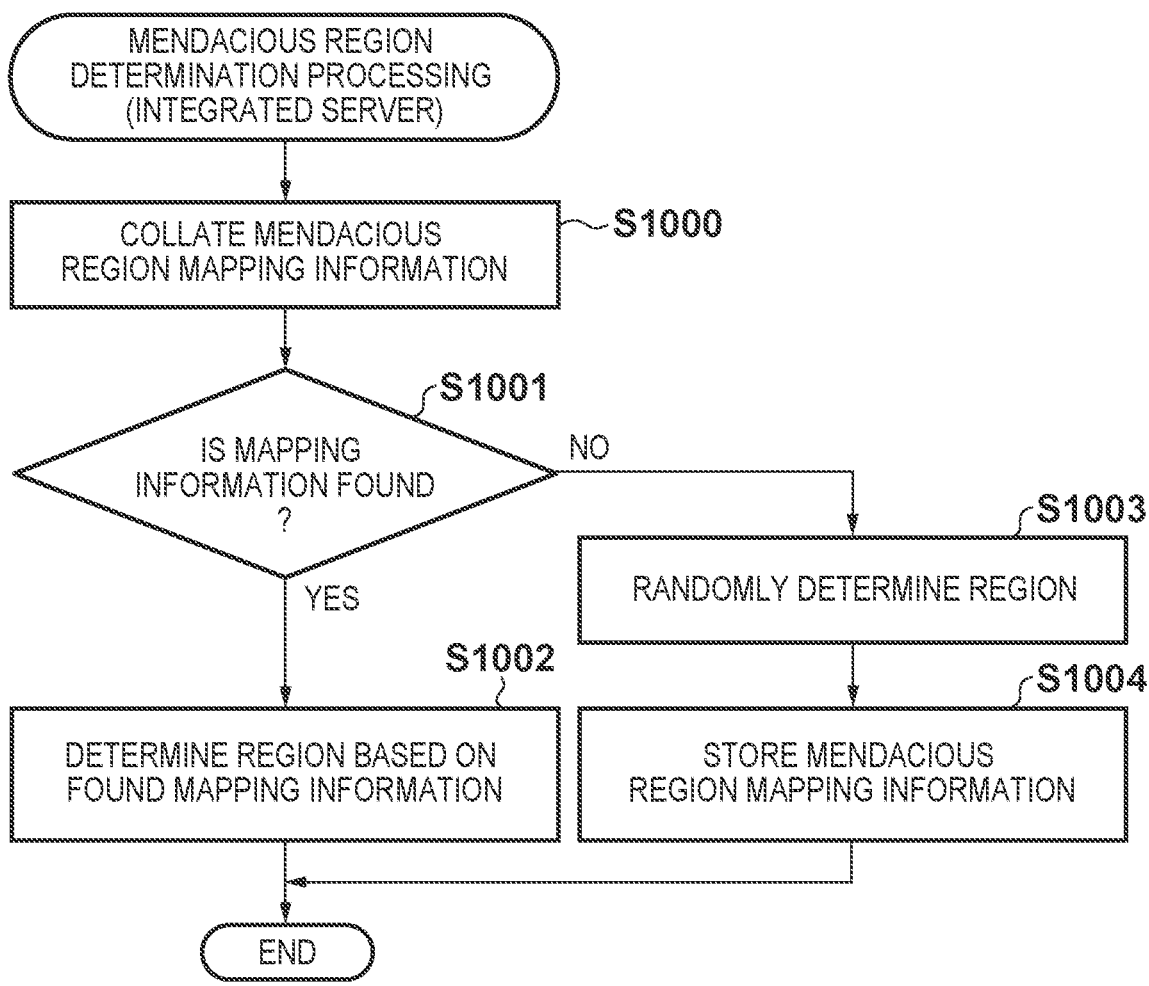
FIG. 10 is a flowchart illustrating an operation at the time of mendacious region determination processing of the integrated server in a second embodiment.
FIG. 11 is a diagram illustrating an example of a hash value of a user ID and mapping information of a mendacious region.

The details of the mendacious region determination processing (step S705 of FIG. 7) of the second embodiment will be described with reference to the flowchart of FIG. 10.

First, in step S1000, the mapping information collation unit 603 collates mapping information for mendacious use in the mapping information managing unit 602 using the hash value of the user ID calculated in step S701 as a key. An example of mapping information for mendacious use managed by the mapping information managing unit 602 (stored and held in the external storage apparatus 204) is illustrated in FIG. 11. "user_id_hash" of the first field are the hash values of user IDs, and "fake_region" of the second field are the mendacious region information that corresponds to the hash values of the user IDs which have been responded with in the past.

In step S1001, the mapping information collation unit 603 determines whether or not there is a matching hash value in the mapping information for mendacious use.

If it is present (step S1001 is YES), the region determining unit 604 determines the region associated with the hash value found in step S1002 as a mendacious region.

On the other hand, if there is no matched hash value (if step S1001 is NO), the region determining unit 604 determines a region, for example, randomly, in step S1003. Then, in step S1004, the mapping information managing unit 602 additionally registers the mendacious region determined in step S1003 and the hash value of the user ID in the mapping information for mendacious use.

Thus, a mendacious region is uniquely determined for a particular user ID, so that even if a region specifying request is sent multiple times for the same user ID, the same region specifying result is sent in the response every time. Therefore, it is possible to make it difficult to determine whether or not the user ID is registered in any region. Although the method of randomly determining a region in step S1003 has been described, the present invention is not limited to this.

For example, configuration may also be taken such that the source IP address of the region specifying request received in step S700 is analyzed, and a region geographically distant from the source is stored as mapping information. In general, there is a tendency that as the physical distance increases, the communication speed decreases, so the frequency at which authentication requests are sent to the authentication server by the attacker can be reduced.

As described above, by virtue of the information processing system according to the present embodiment, the integrated server 130 responds to a region specifying request for a user ID that is not registered in any region with a mendacious region that is uniquely determined from the user ID. Therefore, it is possible to make it difficult to determine by a region specifying request whether or not a user ID is registered.

Third Embodiment

In the above-described first embodiment, a method of determining a mendacious region that is uniquely determined every time a region specifying request is received in the region specifying processing by the integrated server 130 has been described.

In the third embodiment, a method in which an integrated server returns, as a mendacious region, a region of a pseudo authentication server which does not perform authentication processing will be described. Note that description will be omitted for the example of hardware configuration since it is the same as that of the first embodiment.

Figure 12:
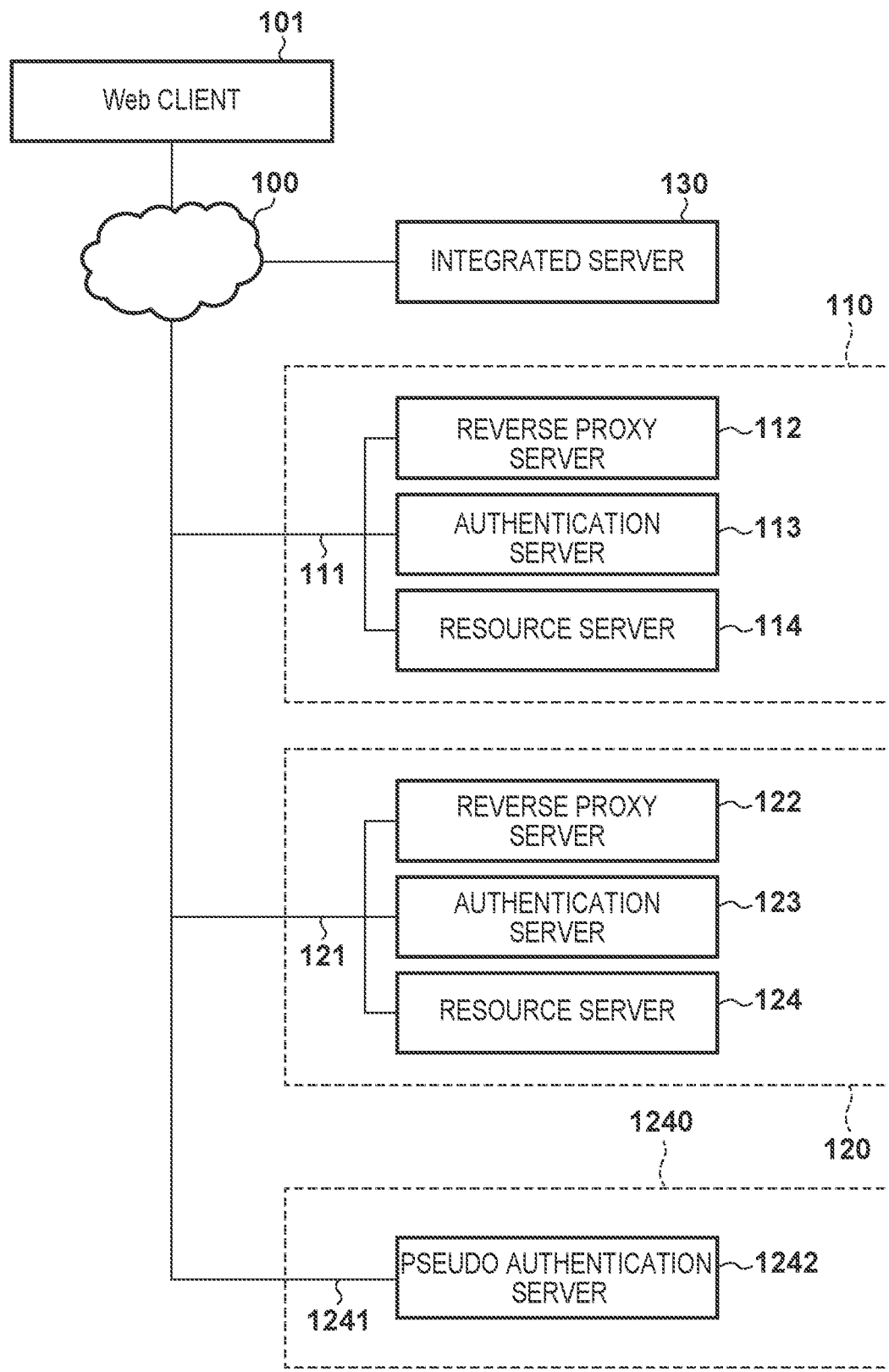
FIG. 12 is a diagram illustrating a network configuration of an information processing system in a third embodiment.

An example of a network configuration of an information processing system according to the present embodiment will be described with reference to the block diagram of FIG. 12.

In the present embodiment, a data center 1240 has been added in addition to the network configuration of the first embodiment, and hereinafter, the data center 1240 is referred to as an AN region. A pseudo authentication server 1242 is connected to a computer network 1241 in an AN region 1240.

In this embodiment, a pseudo authentication server is present only in the AN region 1240, but the present invention is not limited to this. The pseudo authentication servers may be present in multiple regions, or in a region where an authentication server is present.

Figure 13:
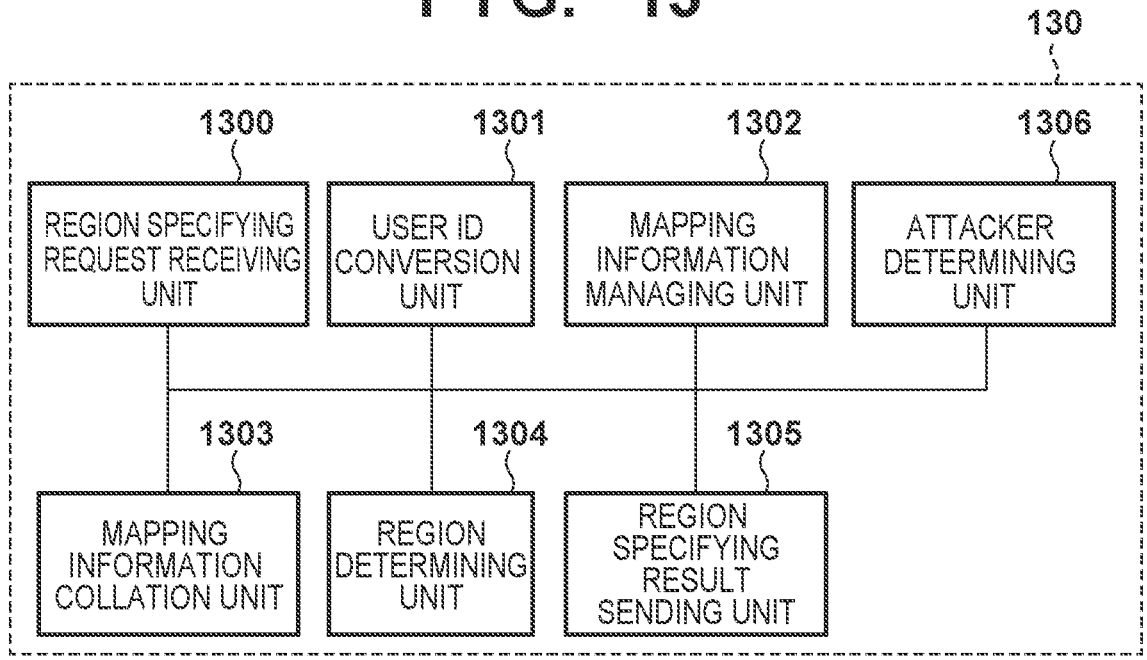
FIG. 13 is a block diagram illustrating a functional configuration of an integrated server in the third embodiment.

Next, a functional configuration of the integrated server 130 according to the present embodiment will be described with reference to the block diagram of FIG. 13. The configuration illustrated in FIG. 13 represents a functional configuration for a case where the CPU 200 of the integrated server 130 executes a program for functioning as an integrated server. For descriptive convenience, it is assumed that the hardware of the integrated server 130 has the configuration of FIG. 2.

The integrated server 130 includes an attacker determining unit 1306 in addition to the configuration of the first embodiment. Description will be omitted for reference numerals 1300 to 1305 since they are the same as the reference numerals 600 to 605. The attacker determining unit 1306 determines whether or not a Web client is an attacker based on a region specifying request and additional information thereof sent from the Web client 101.

Figure 14:
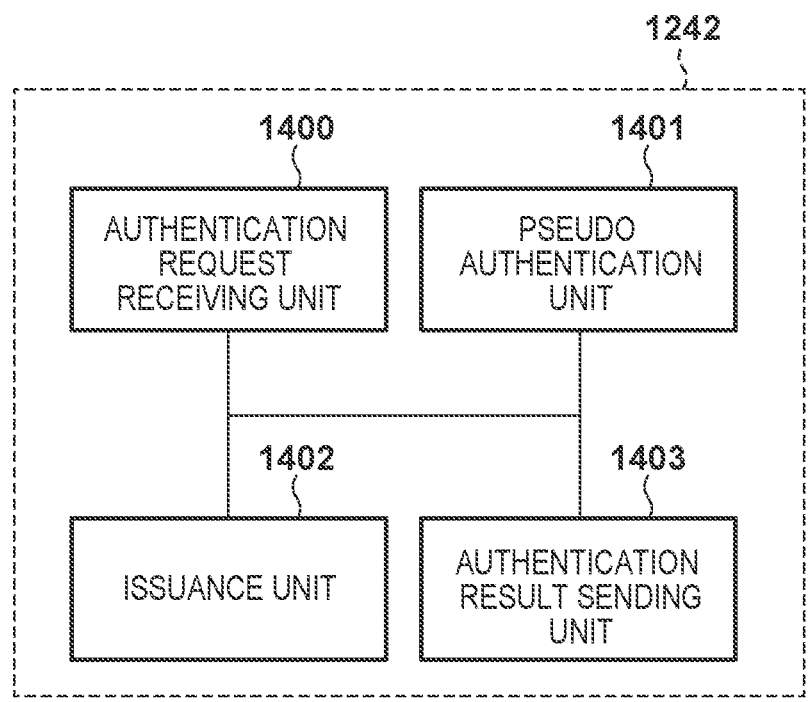
FIG. 14 is a block diagram illustrating a functional configuration of a pseudo authentication server in the third embodiment.

Next, a functional configuration of the pseudo authentication server 1242 according to the present embodiment will be described with reference to the block diagram of FIG. 14. The configuration illustrated in FIG. 14 represents a functional configuration for a case where the CPU 200 of the pseudo authentication server 1242 executes a program for functioning as a pseudo authentication server. For descriptive convenience, it is assumed that the hardware of the pseudo authentication server 1242 has the configuration of FIG. 2.

The pseudo authentication server 1242 includes an authentication request receiving unit 1400, a pseudo authentication unit 1401, an issuance unit 1402, and an authentication result sending unit 1403.

The authentication request receiving unit 1400 receives an authentication request sent from the Web client 101 via the network interface 203.

The pseudo authentication unit 1401 performs pseudo authentication for an authentication request received by the authentication request receiving unit 1400. Pseudo authentication may be processing that simply always returns an authentication failure, and may verify only the format of an authentication request that is invalid as in the normal authentication processing.

For example, the authentication servers 113 and 114 have a constraint for the user ID of an authentication request to include a specific character, and if the user ID of the authentication request does not include a specific character, respond to the Web client with an invalid format error. In that case, the pseudo authentication unit 1401 verifies whether or not a specific character is included in the user ID of the authentication request as in the authentication server, and if it is not included, responds to the Web client with an invalid format error.

The issuance unit 1402 issues a pseudo authentication result based on the result of the pseudo authentication unit 1401. In the case of authentication failure, a pseudo authentication result that is the same as the authentication result at the time of authentication failure in the authentication servers 113 and 114 is issued. Alternatively, a pseudo authentication token that has the same format as an authentication token issued at the time of authentication success of authentication servers 113 and 114 may be issued as a pseudo authentication result. A pseudo authentication token is a token that is set in a cookie in the Web client 101 as in a normal authentication token, but cannot be used.

The authentication result sending unit 1403 sends the pseudo authentication result issued by the issuance unit 1402 to the Web client 101 via the network interface 203.

Figure 15:
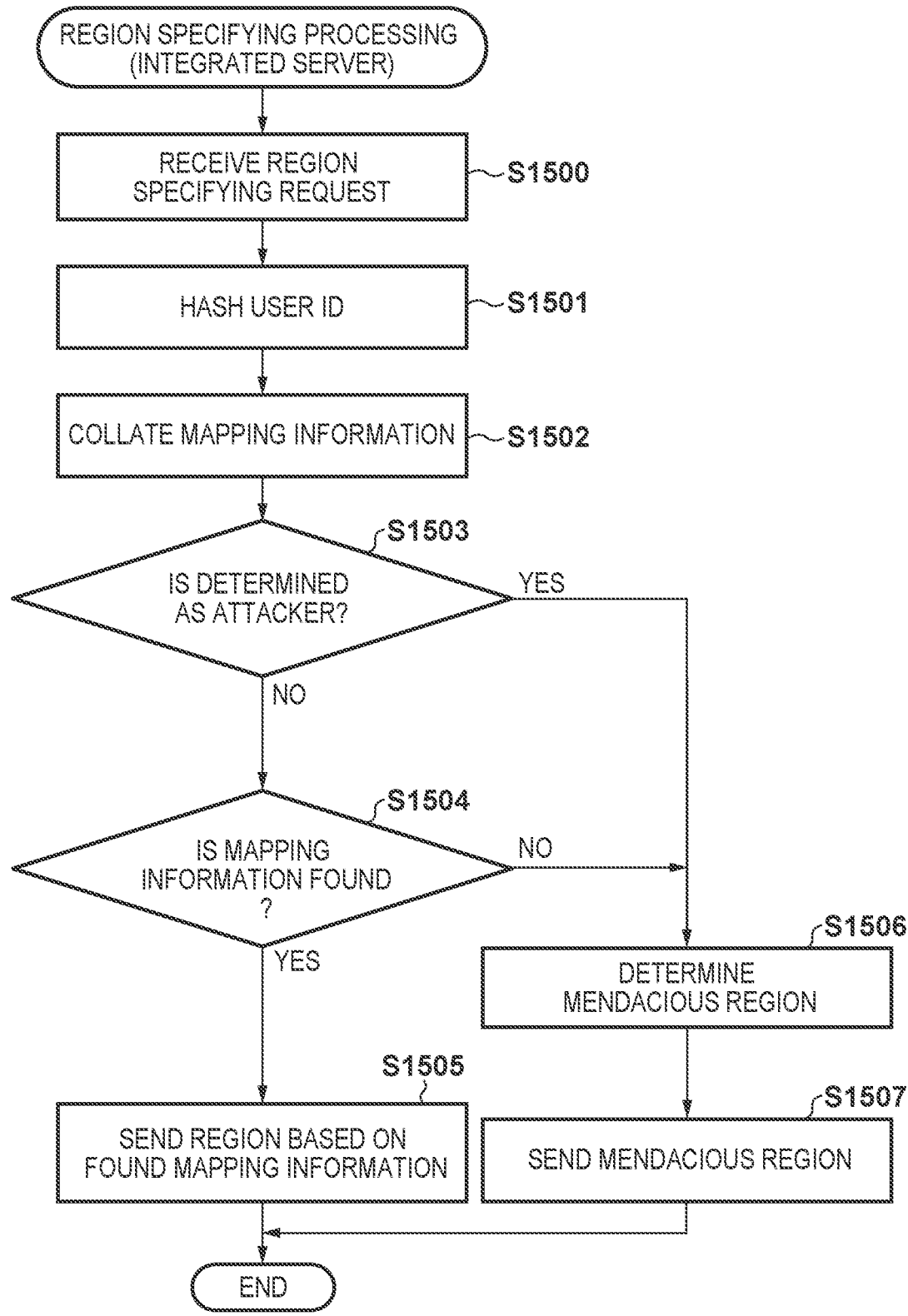
FIG. 15 is a flowchart illustrating an operation of region specifying processing of the integrated server in the third embodiment.

Next, region specifying processing of the integrated server 130 according to the present embodiment will be described with reference to the flowchart of FIG. 15.

Description will be omitted for step S1500 to step S1502 since they are the same as step S700 to step S702 in the first embodiment.

In step S1503, the attacker determining unit 1306 determines whether or not the Web client 101 is an attacker. The determination processing uses the additional information received along with the region specifying request. For example, an IP address, which is the source information of the region specifying request, is acquired as the additional information, and if it is a specific IP address or IP address range, it is determined as an attacker. In addition, by configuring so as to cause only the legitimate Web client 101 to send a specific character string as additional information together with a region specifying request, it is possible to determine whether or not it is an attacker based on the presence or absence of the additional information.

Further, the attacker determining unit 1306 may store a collation result of the mapping information collation unit 1303 and additional information of the region specifying request in association with each other as a region specifying request history and use it for determining an attacker. Configuration may be taken such that the collation result is stored in association with the IP address which is additional information, and if there is a collation failure history of a certain number of times or more within a predetermined time with the same IP address, it is determined that a region specifying request from that IP address is by an attacker.

If it is determined to be not an attacker (if step S1503 is NO), the mapping information collation unit 1303 determines whether or not the hash value obtained by the calculation in step S1501 is present in the mapping information in step S1504 as in step S703.

If a matching hash value is found (if step S1504 is YES), a region specifying result sending unit 1305 sends a region specifying result to the Web client 101 in step S1505 as in step S704.

On the other hand, if it is determined to be an attacker (if step S1503 is YES) or if the mapping information is not found (if NO in step S1504), a region determining unit 1304 determines a mendacious region in step S1506. Then, in step S1507, the region specifying result sending unit 1305 sends a mendacious region to the Web client 101 as a region specifying result as in step S706.

Here, the method of determining a mendacious region in step S1506 is the same as in the flowchart of FIG. 9. However, in step S902 and step S903, the region of the pseudo authentication server is used instead of the region of the authentication server.

In step S902, the region determining unit 1304 considers the hash value obtained by the calculation as a numeric value, divides it by the total number of regions of the pseudo authentication server, and obtains a remainder value. Next, in step S903, the region determining unit 1304 determines the region of the pseudo authentication server corresponding to the remainder value as a mendacious region.

As described above, the integrated server 130 of the present embodiment responds to a region specifying request for a user ID that is not registered in any of the regions with a mendacious region that is uniquely determined from the user ID. In addition, a mendacious region is also responded to the request source (Web client) determined as an attacker. At that time, a mendacious region is chosen from the region of the pseudo authentication server. Therefore, it is possible to make it difficult for the user of a request source (Web client) to distinguish by a region specifying request whether or not the user ID is registered, and by using a pseudo authentication server, to reduce the load that the authentication server takes.

Fourth Embodiment

In the above-described third embodiment, a method of returning a region of the pseudo authentication server which does not perform authentication processing as a mendacious region in the region specifying processing by the integrated server 130 has been described.

In the fourth embodiment, a method of omitting the authentication processing of the authentication server by the integrated server determining whether or not the Web client is an attacker and notifying the authentication server will be described. Note that description will be omitted for the example of the network configuration and the example of hardware configuration since it is the same as that of the first embodiment.

Figure 16:
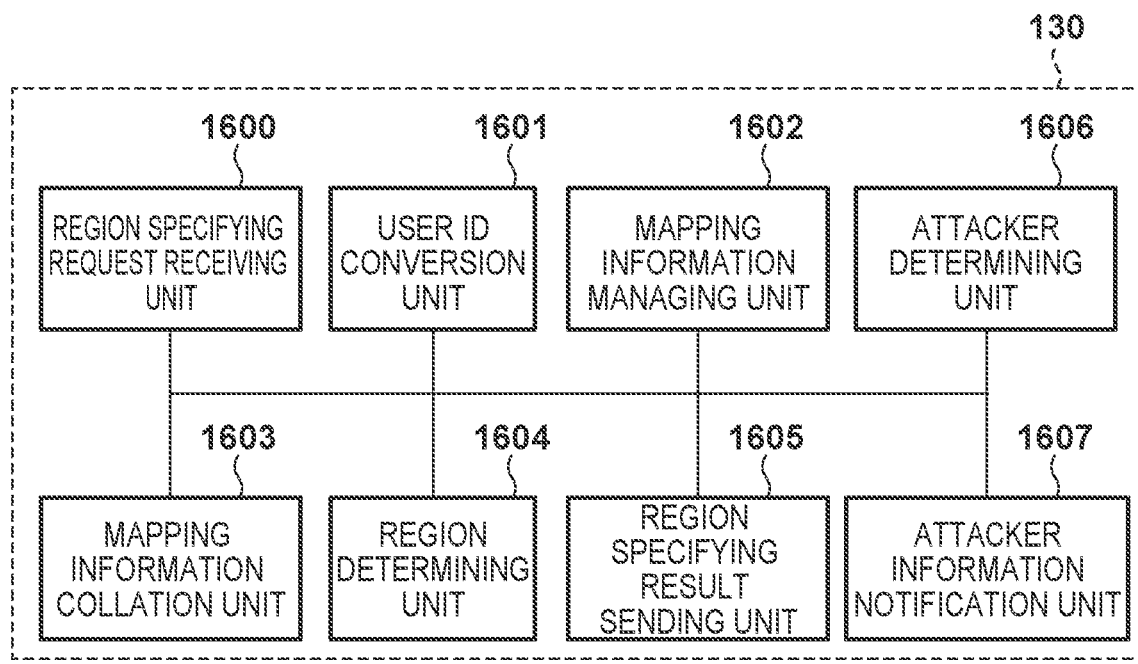
FIG. 16 is a block diagram illustrating a functional configuration of an integrated server in a fourth embodiment.

Next, a functional configuration of the integrated server 130 according to the present embodiment will be described with reference to the block diagram of FIG. 16. The configuration illustrated in FIG. 16 represents a functional configuration for a case where the CPU 200 of the integrated server 130 executes a program for functioning as an integrated server. For descriptive convenience, it is assumed that the hardware of the integrated server 130 has the configuration of FIG. 2.

The integrated server 130 includes an attacker information notification unit 1607 in addition to the configuration of the third embodiment. Description will be omitted for reference numerals 1600 to 1606 since they are the same as the reference numerals 1300 to 1306. The attacker information notification unit 1607 notifies each authentication server of the information of the Web client determined to be an attacker by an attacker determining unit 1606. The information to be notified need only be information that can specify the attacker, and information such as the IP address of the Web client can be used.

Next, the region specifying processing of the integrated server 130 according to the present embodiment is the same as that of the flowchart of FIG. 15, but is different in some processes, and therefore only those processes will be described.

In step S1503, the attacker determining unit 1606 determines whether or not the Web client 101 is an attacker. The determination method is the same as that of the third embodiment, but if it is determined to be an attacker, the attacker information notification unit 1607 notifies each authentication server of the attacker information.

The method of determining a mendacious region in step S1506 is the same as that of the flowchart of FIG. 9, and the mendacious region is determined from the authentication server as in the first embodiment.

Figure 17:
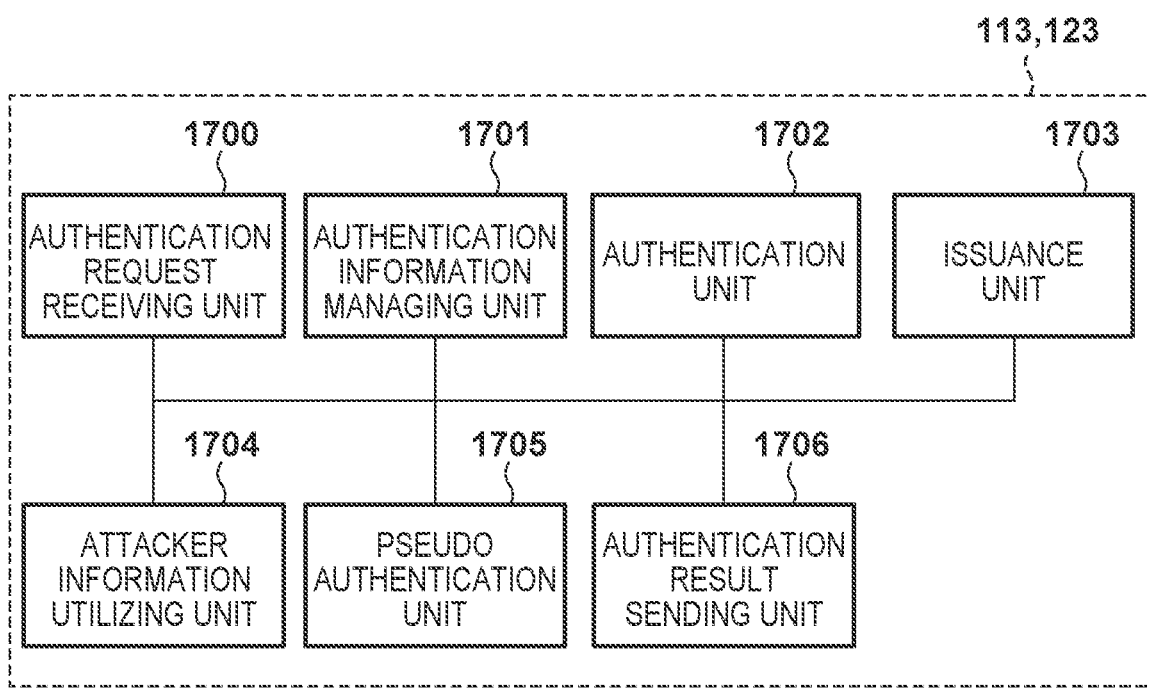
FIG. 17 is a block diagram illustrating a functional configuration of an authentication sever in the fourth embodiment.

Next, a functional configuration of the authentication servers 113 and 114 according to the present embodiment will be described with reference to the block diagram of FIG. 17.

Each of the authentication servers 113 and 123 includes an authentication request receiving unit 1700, an authentication information managing unit 1701, an authentication unit 1702, an issuance unit 1703, an attacker information utilizing unit 1704, a pseudo authentication unit 1705, and an authentication result sending unit 1706.

The authentication request receiving unit 1700 receives an authentication request sent from the Web client 101 via the network interface 203.

The authentication information managing unit 1701 stores and holds in the external storage apparatus 204 and manages authentication information associated with the user ID and password of the user registered in each authentication server.

The authentication unit 1702 authenticates the user by collating the authentication request received by the authentication request receiving unit 1700 with the authentication information managed by the authentication information managing unit 1701.

The issuance unit 1703 issues an authentication token indicating that the user has been authenticated.

The attacker information utilizing unit 1704 stores and holds the attacker information notified from the integrated server 130. In addition, whether or not the Web client 101 that sent the authentication request is an attacker is determined based on the stored attacker information.

The pseudo authentication unit 1705 performs pseudo authentication for the authentication request determined to be by an attacker by the attacker information utilizing unit 1704 as in the pseudo authentication unit 1401 of the integrated server in the third embodiment. In this case, the issuance unit 1703 issues the pseudo authentication result based on the result of the pseudo authentication unit 1705 as in the issuance unit 1402 of the integrated server in the third embodiment.

The authentication result sending unit 1706 sends the authentication token or the pseudo authentication result issued by the issuance unit 1703 to the Web client 101 via the network interface 203.

Figure 18:
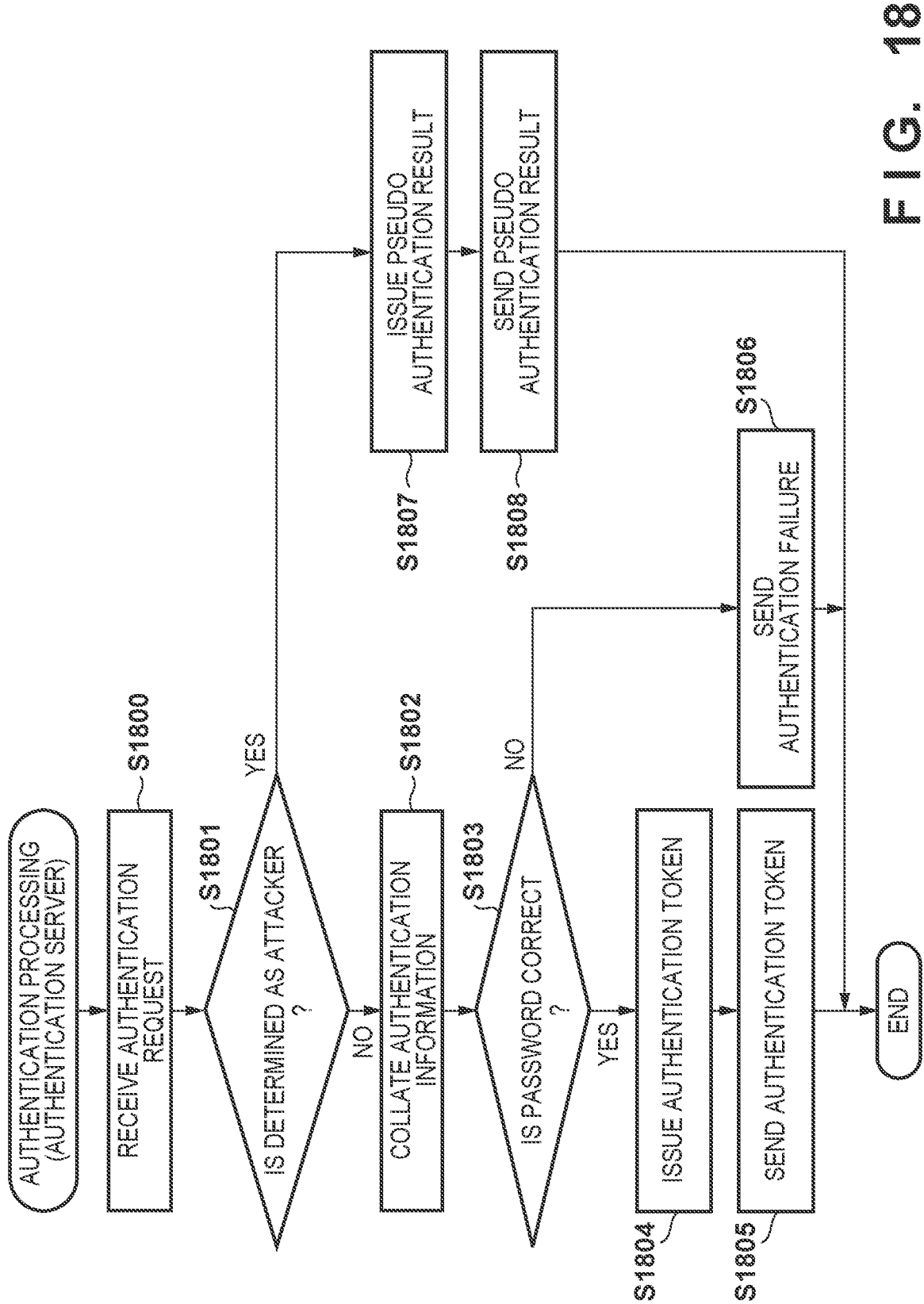
FIG. 18 is a flowchart illustrating an operation of authentication processing of the authentication server in the fourth embodiment.

Next, authentication processing of the authentication servers 113 and 123 according to the present embodiment will be described with reference to the flowchart of FIG. 18.

First, in step S1800, the authentication request receiving unit 1700 receives an authentication request sent from the Web client 101.

Next, in step S1801, the attacker information utilizing unit 1704 determines whether or not the Web client 101 that sent the authentication request is an attacker. If it is determined to be an attacker (YES in step S1801), the processing proceeds to step S1807. If it is determined to be not an attacker (YES in step S1801), the processing proceeds to step S1802.

Next, in step S1802, the authentication unit 1702 collates the user ID and password included in the authentication request received in step S1800 with the authentication information managed by the authentication information managing unit 1701.

If the user ID is registered in the authentication information managing unit 1701 and the password matches (if step S1803 is YES), the issuance unit 1703 issues an authentication token in step S1804. Then, in step S1805, the authentication result sending unit 1706 sends the authentication token as an authentication result to the Web client 101. On the other hand, if the password does not match (if step S1803 is NO), the authentication result sending unit 1706 sends in step S1806 an authentication result of an authentication failure to the Web client 101.

Next, in step S1807, pseudo authentication is performed in the pseudo authentication unit 1705, and a pseudo authentication result is issued in the issuance unit 1703. Description will be omitted for the pseudo authentication and the issuance of the pseudo authentication result since they are the same as those in the third embodiment.

Next, in step S1808, the authentication result sending unit 1706 sends the pseudo authentication result issued by the issuance unit 1402 to the Web client 101 via the network interface 203.

As described above, in the present embodiment, the integrated server 130, by determining whether or not the Web client 101 is an attacker and notifies the result to the authentication servers 113 and 123, performs pseudo authentication instead of authentication processing of the authentication server. This allows to reduce the load that each authentication server takes for a request of an attacker without having to arrange a pseudo authentication server.

Fifth Embodiment

In the above-described first embodiment, a method of determining a mendacious region that is uniquely determined every time a region specifying request is received in the region specifying processing by the integrated server 130 has been described.

In the fifth embodiment, an example in which an authentication server specifies and responds with a region in place of an integrated server is described. Note that description will be omitted for the example of the network configuration and the example of hardware configuration since it is the same as that of the first embodiment.

Figure 19:
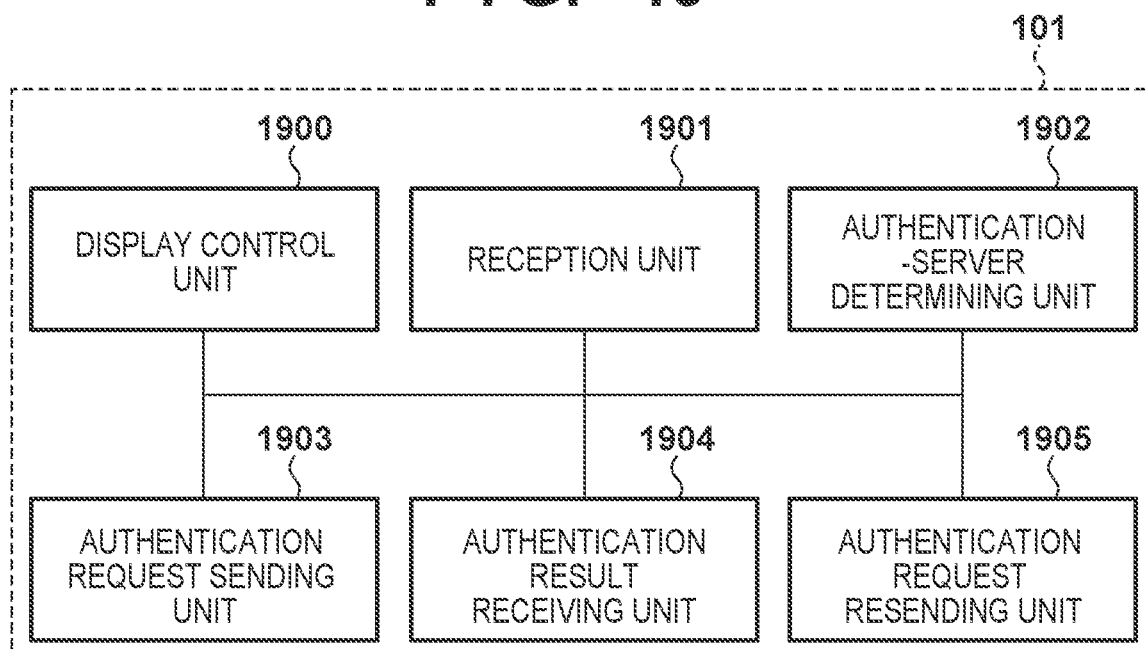
FIG. 19 is a block diagram illustrating a functional configuration of a Web client in a fifth embodiment.

First, a functional configuration of the Web client 101 according to the fifth embodiment will be described with reference to the block diagram of FIG. 19. The configuration illustrated in FIG. 19 represents a functional configuration for a case where the CPU 200 of the Web client 101 executes a program as a Web client.

The Web client 101 includes a display control unit 1900, a reception unit 1901, an authentication-server determining unit 1902, an authentication request sending unit 1903, an authentication result receiving unit 1904, and an authentication request resending unit 1905. For descriptive convenience, it is assumed that the hardware of the Web client 101 has the configuration of FIG. 2.

The display control unit 1900 displays a login screen on the display apparatus 205. In addition, the display control unit 1900 displays a login success screen and a login failure screen on the display apparatus 205 in accordance with an authentication result to be described later.

The reception unit 1901 accepts input of a user ID and a password from the input apparatus 206 for the login screen displayed by the display control unit 1900.

The authentication-server determining unit 1902 determines a first authentication server that sends an authentication request and a second authentication server.

the authentication request sending unit 1903 sends to the first authentication server determined by the authentication-server determining unit 1902 a first authentication request based on the user ID and password received by the reception unit 1901.

The authentication result receiving unit 1904 receives an authentication result sent from the authentication server.

The authentication request resending unit 1905 sends to the second authentication server determined by the authentication-server determining unit 1902 a second authentication request based on the user ID and password received by the reception unit 1901.

Figure 20:
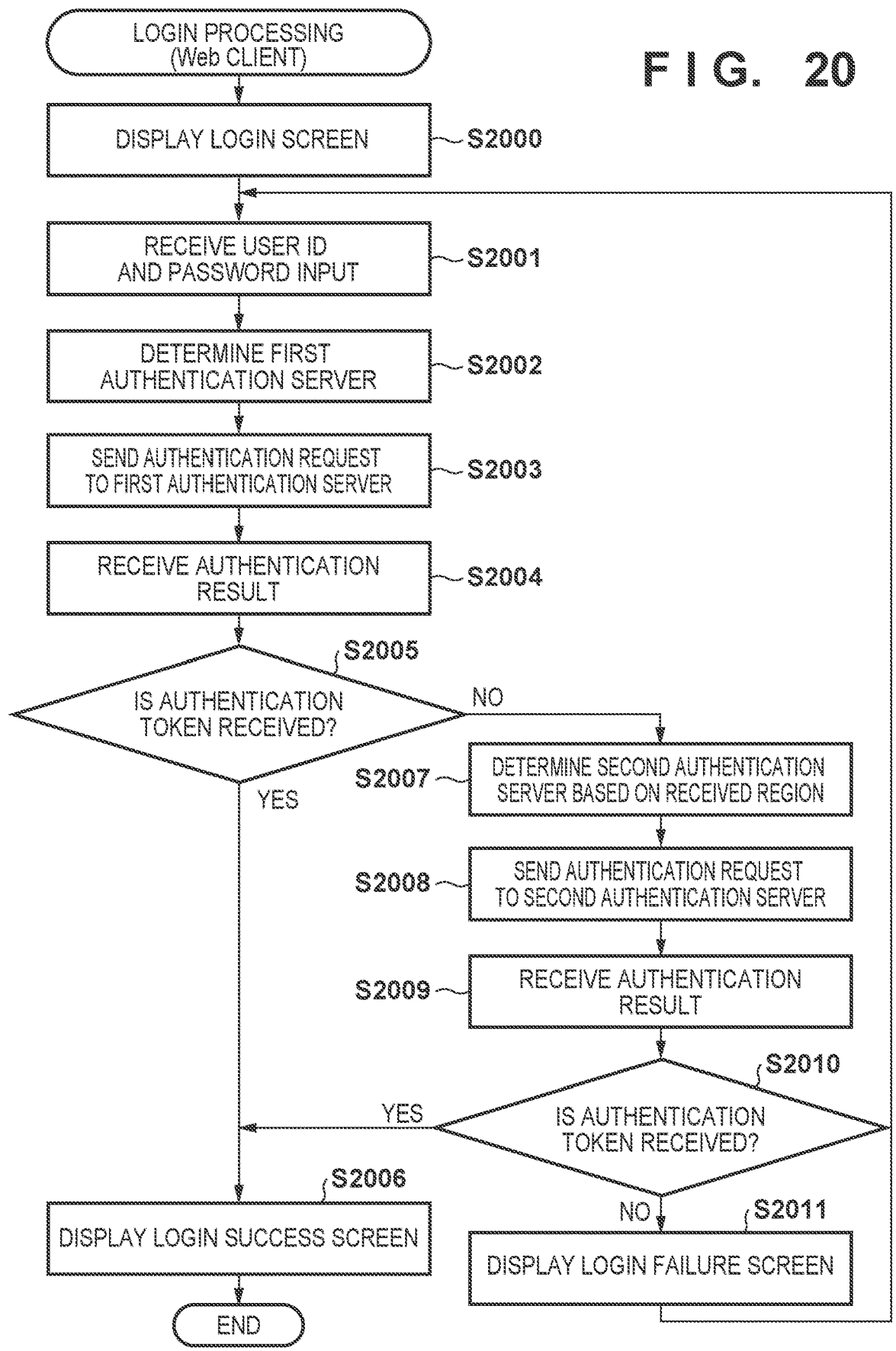
FIG. 20 is a flowchart illustrating an operation at the time of login processing of the Web client in the fifth embodiment.

Next, a processing procedure at the time of login processing of the Web client 101 according to the fifth embodiment will be described with reference to the flowchart of FIG. 20.

First, in step S2000, the display control unit 1900 acquires a login screen from the integrated server 130, and displays it on the display apparatus 205. Description will be omitted for the displayed login screen since it is the same as that of the first embodiment.

Next, in step S2001, the reception unit 1901 receives an input of the user ID and the password for the login screen from the user. Here, the user uses the input apparatus 206 to input a user ID in the user ID input field 501 and a password in the password input field 502 of the login screen 500, and confirms the input by pressing the button 503.

In response to the confirmation of the input of the user ID and the password, the authentication-server determining unit 1902 determines in step S2002 the first authentication server to be a target of sending the authentication request. For example, if the IP address of the Web client 101 is close to the US region 110, the authentication-server determining unit 1902 determines the authentication server 113 of the US region 110 as the first authentication server. Similarly, if the IP address of the Web client 101 is close to the EU region 120, the authentication-server determining unit 1902 determines the authentication server 123 of the EU region 120 as the first authentication server. As described above, by determining the authentication server close to the Web client used by the user as the first authentication server, there is a high possibility that the user can be authenticated by the first authentication request described later.

Next, in step S2003, the authentication request sending unit 1903 sends a first authentication request to the first authentication server determined as a sending target. The authentication request includes at least the user ID and the password received by the reception unit 1901. If the authentication server 113 of the US region 110 is determined to be a target of sending the authentication request, the URL specified at the time of sending will be a URL having a domain name unique to the US region 110. Also, if the authentication server 123 in the EU region 120 is determined to be a target of sending the authentication request, the URL will have a domain name unique to the EU region 120. The authentication server authenticates the user based on the user ID and password included in the received authentication request, determines a region, and responds with an authentication result to the Web client 101 that is the request source. Authentication of the user by the authentication server and determination processing of the region will be described later.

In step S2004, the authentication result receiving unit 1904 receives the authentication result sent from the first authentication server. Then, in step S2005, the authentication result receiving unit 1904 determines whether the received authentication result is an authentication token or a region. If it an authentication token (if step S2005 is YES), the display control unit 1900 displays a login success screen on the display apparatus 205 in step S2006. On the other hand, if the authentication result is a region (if step S2005 is NO), the authentication-server determining unit 1902 determines in step S2007 the second authentication server to be resent the authentication request based on the received region. For example, if the received region is the US region 110, the authentication-server determining unit 1902 determines the authentication server 113 of the US region 110 as the second authentication server. Similarly, if the received region is the EU region 120, the authentication-server determining unit 1902 determines the authentication server 123 of the EU region 120 as the second authentication server.

Next, in step S2008, the authentication request resending unit 1905 sends a second authentication request to the second authentication server determined as a sending target. The authentication request includes at least the user ID and the password received by the reception unit 1901. If the authentication server 113 of the US region 110 is determined to be a target of sending the authentication request, the URL specified at the time of sending will be a URL having a domain name unique to the US region 110. Also, if the authentication server 123 in the EU region 120 is determined to be a target of sending the authentication request, the URL will have a domain name unique to the EU region 120. The authentication server authenticates the user based on the user ID and password included in the received authentication request, determines a region, and responds with an authentication result to the Web client 101 that is the request source.

In step S2009, the authentication result receiving unit 1904 receives the authentication result sent from the second authentication server. Then, in step S2010, the authentication result receiving unit 1904 determines whether the received authentication result is an authentication token or a region. If it an authentication token (if step S2010 is YES), the display control unit 1900 displays a login success screen on the display apparatus 205 in step S2006. On the other hand, if the authentication result is a region (if NO in step S2010), the display control unit 1900 displays a login failure screen on the display apparatus 205 in step S2011.

Figure 21:
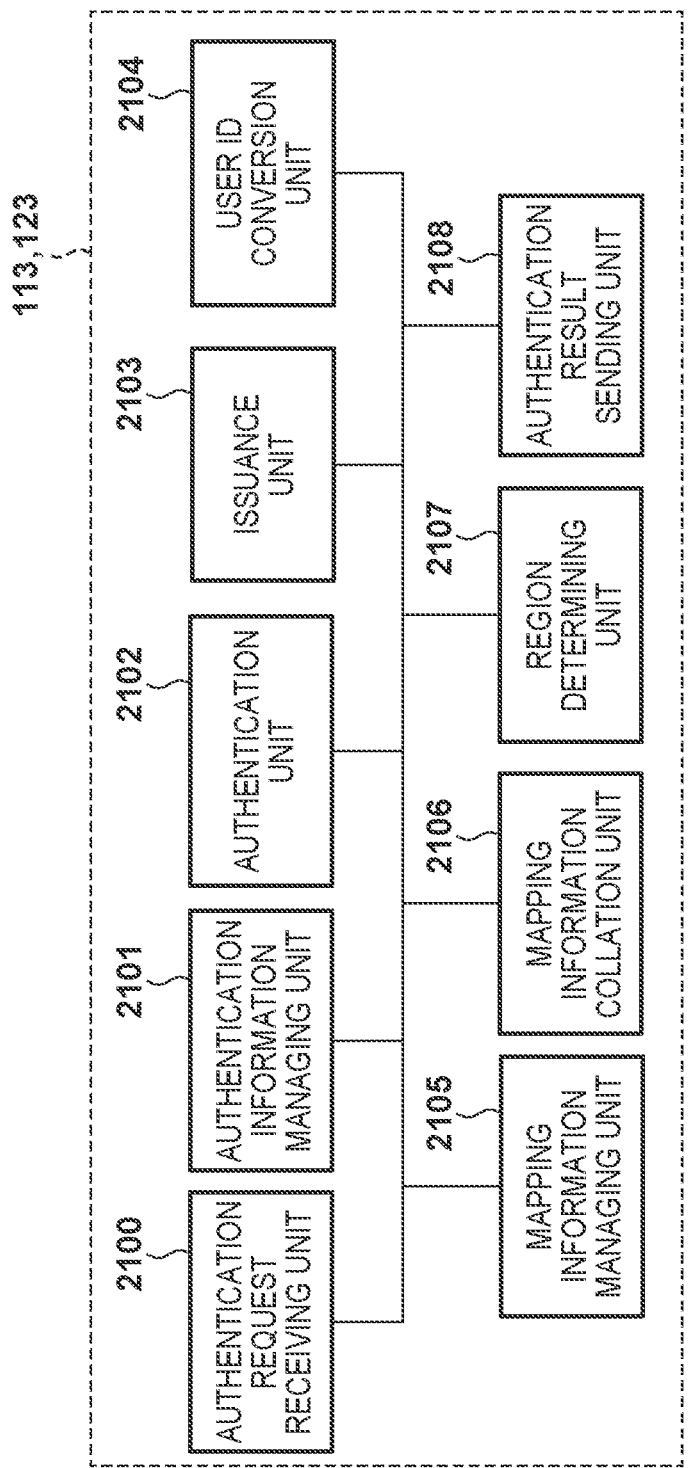
FIG. 21 is a block diagram illustrating a functional configuration of an authentication server in the fifth embodiment.

Next, a functional configuration of the authentication servers 113 and 123 according to the fifth embodiment will be described with reference to the block diagram of FIG. 21. The configuration illustrated in FIG. 21 represents a functional configuration for a case where the CPUs 200 of the authentication servers 113 and 123 execute programs for functioning as authentication servers. For descriptive convenience, it is assumed that the hardware of the authentication servers 113 and 123 has the configuration of FIG. 2.

Each of the authentication servers 113 and 123 includes an authentication request receiving unit 2100, an authentication information managing unit 2101, an authentication unit 2102, an issuance unit 2103, a user ID conversion unit 2104, a mapping information managing unit 2105, a mapping information collation unit 2106, a region determining unit 2107, and an authentication result sending unit 2108.

The authentication request receiving unit 2100 receives an authentication request sent from the Web client 101 via the network interface 203.

The authentication information managing unit 2101 stores and holds in the external storage apparatus 204 and manages authentication information associated with the user ID and password of the user registered in each authentication server.

The authentication unit 2102 authenticates the user by collating the authentication request received by the authentication request receiving unit 2100 with the authentication information managed by the authentication information managing unit 2101.

The issuance unit 2103 issues an authentication token indicating that the user has been authenticated.

The user ID conversion unit 2104 converts the user ID included in the authentication request to a hash value.

The mapping information managing unit 2105 stores and holds in the external storage apparatus 204 and manages the hash values of user IDs registered in each region and the mapping information of the regions in which the corresponding users are registered. The hash values of the user IDs are stored in order to protect the user IDs which can be personal information.

The mapping information collation unit 2106 collates (or searches) in the mapping information managing unit 2105 using the hash value of the user ID calculated by the user ID conversion unit as a key, determines whether or not it is present (a collation result), and if it is present, specifies the corresponding region.

The region determining unit 2107 determines a mendacious region based on the user ID included in the authentication request.

The authentication result sending unit 2108 sends an authentication result representing either the authentication token issued by the issuance unit 2103, the region specified by the mapping information collation unit 2106, or the mendacious region determined by the region determining unit 2107 to the Web client 101 via the network interface 203.

Figure 22:
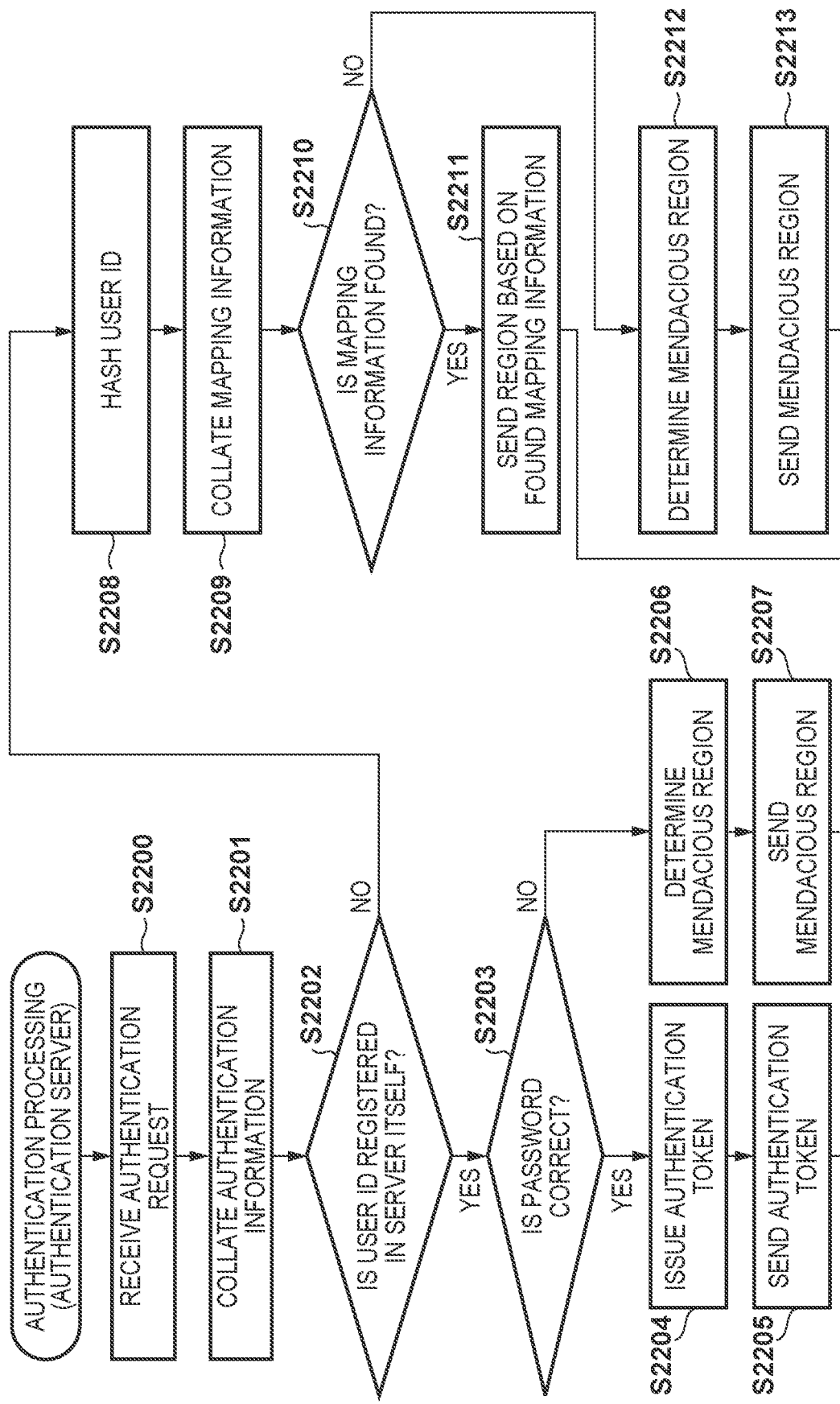
FIG. 22 is a flowchart illustrating an operation of at the time of authentication processing of the authentication server in the fifth embodiment.

Next, authentication processing of the authentication server 113 and 123 according to the fifth embodiment will be described with reference to the flowchart of FIG. 22.

First, in step S2200, the authentication request receiving unit 2100 receives an authentication request sent from the Web client 101.

Next, in step S2201, the authentication unit 2102 collates the user ID and password included in the authentication request received in step S2200 with the authentication information managed by the authentication information managing unit 2101.

If the user ID is registered in the authentication information managing unit 2101 (if step S2202 is YES) and the password also matches (if step S2203 is YES), the issuance unit 2103 issues an authentication token in step S2204. Then, in step S2205, the authentication result sending unit 2108 sends the authentication token as an authentication result to the Web client 101. On the other hand, if the password does not match (NO in step S2203), the region determining unit 2107 determines a mendacious region in step S2206. Then, in step S2207, the authentication result sending unit 2108 sends a mendacious region as an authentication result to the Web client 101. Note that description is omitted for the method of determining a mendacious region since it is the same as in step S705 of the first embodiment.

If the user ID is not registered in the authentication information managing unit 2101 (if step S2202 is NO), the user ID conversion unit 2104 calculates in step S2208 a hash value of the user ID included in the authentication request received in step S2200.

Next, in step S2209, the mapping information collation unit 2106 collates mapping information of a region from the mapping information managing unit 2105 based on the hash value of the user ID obtained in step S2208. Description is omitted for the mapping information of a region since it is the same as that of the example of the first embodiment.

If mapping information matching the hash value is found (step S2210 is YES), the authentication result sending unit 2108 sends in step S2211 the region associated with the matched hash value to the Web client 101 as an authentication result.

On the other hand, if the mapping information is not found (NO in step S2210), the region determining unit 2107 determines a mendacious region in step S2212. Then, in step S2213, the authentication result sending unit 2108 sends a mendacious region as an authentication result to the Web client 101. Note that description is omitted for the method of determining a mendacious region since it is the same as in step S705 of the first embodiment.

As described above, the authentication servers 113 and 123 according to the fifth embodiment respond with an authentication token to the authentication request including the correct user ID and password. If the Web client 101 determines the authentication server in which the user ID is registered as the first authentication server and sends the first authentication request, the login is completed by a single instance of communication between the Web client and the authentication server, thereby improving usability. Further, with regard to an authentication request for a user ID that is not registered in any region and an authentication request for a password error, a response is made with a mendacious region that is uniquely determined from the user ID, whereby it is possible to make it difficult to determine whether or not to the user ID is registered.

In the fifth embodiment, the authentication servers 113 and 123 determine and respond with a mendacious region uniquely determined from the user ID, and this determination method may be made to be the same across the authentication servers. As a result, the region to be responded for each user ID becomes unique in each authentication server, whereby it is possible to make it more difficult to determine whether or not the user ID is registered.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-153175, filed Sep. 11, 2020 and 2021-136656, filed Aug. 24, 2021 which are hereby incorporated by reference herein in their entirety.

What is claimed is:

1. An information processing apparatus, comprising:
a network interface configured to communicate with the Internet;
a processor; and
one or more memories storing instructions that when executed by the processor implement:
a managing unit configured to manage mapping information in which user information and region information are associated;
a collation unit configured to, in a case where a region specifying request which includes user information specifying a user is received from a client terminal via the network interface, collate the mapping information of the managing unit; and
a response unit configured to,
in a case where a collation result of the collation unit indicates that user information that corresponds to the user information specifying the user included in the region specifying request is present in the mapping information, send, to the client terminal, region information that corresponds to the user information that is present in the mapping information as a response, and
in a case where the collation result of the collation unit indicates that the user information that corresponds to the user information specifying the user included in the region specifying request is not present in the mapping information, send, to the client terminal, mendacious region information as the response.

2. The apparatus according to claim 1, wherein the user information specifying the user includes a user ID that specifies the user,
wherein the managing unit manages the mapping information which is information in which a hash value of the user ID and the region information are paired,
wherein the collation unit obtains a hash value from a user ID included in the region specifying request and performs collation by searching the mapping information using the obtained hash value as a key.

3. The apparatus according to claim 1, wherein the response unit, in a case where a collation result of the collation unit indicates that a value that matches a hash value of a corresponding user ID is not present in the mapping information, sends, as the response, the mendacious region information that is uniquely determined using a numeric value that the hash value of the corresponding user ID represents.

4. The apparatus according to claim 3, wherein the response unit responds with, as the mendacious region information, information representing a region specified by a remainder value obtained when a numeric value that the hash value of the user ID represents is divided by the number of regions managed by the management unit.

5. The apparatus according to claim 1, wherein the managing unit further manages mapping information for mendacious use in which a hash value of a user ID that is not present in the mapping information and the mendacious region information are paired,
wherein the response unit
in a first case where the collation result of the collation unit indicates that a value that matches a hash value of a user ID corresponding to the mapping information is present and a value that matches the mapping information for mendacious use is present, responds with corresponding mendacious region information in the mapping information for mendacious use, and
in a second case where the collation result of the collation unit indicates that a value that matches a hash value of a user ID corresponding to the mapping information is not present and a value that matches the mapping information for mendacious use is present, registers a pair of the hash value of the user ID and new mendacious region information in the mapping information for mendacious use and responds with the new mendacious region information.

6. The apparatus according to claim 1, wherein the one or more memories further store instructions that, when executed by the processor, further implement an attacker determining unit configured to determine whether or not the client terminal is an attacker, and
wherein the response unit, in a case where it is determined by the attacker determining unit that the client terminal is the attacker, sends the mendacious region information as the response.

7. The apparatus according to claim 6, wherein the attacker determining unit determines whether or not the client terminal is the attacker based on a region specifying request and additional information thereof sent from the client terminal.

8. The apparatus according to claim 6, wherein the attacker determining unit stores a region specifying request sent from the client terminal and additional information thereof as region specifying request history associated with a result of the collation unit, and uses the region specifying request history to determine whether or not the client terminal is the attacker.

9. A method of controlling an information processing apparatus which includes a network interface configured to communicate with the Internet the method comprising:
managing mapping information in which user information and region information are associated;
collating, in a case where a region specifying request which includes user information specifying a user is received from a client terminal via the network interface, the managed mapping information;
sending, in a first case where a first collation result of the collating indicates that user information that corresponds to the user information specifying the user included in the region specifying request is present in the managed mapping information, to the client terminal, region information that corresponds to the user information that is present in the managed mapping information as a first response; and sending, in a second case where a second collation result of the collating indicates that the user information that corresponds to the user information specifying the user included in the region specifying request is not present in the managed mapping information, to the client terminal, mendacious region information as a second response.

10. A non-transitory computer-readable storage medium storing a program which, when read and executed by a computer, causes the computer to execute a method of controlling an information processing apparatus which includes a network interface configured to communicate with the Internet, the method comprising:

managing mapping information in which user information and region information are associated;

collating, in a case where a region specifying request which includes user information specifying a user is received from a client terminal via the network interface, the managed mapping information;

sending, in a first case where a first collation result of the collating indicates that user information that corresponds to the user information specifying the user included in the region specifying request is present in the managed mapping information, to the client terminal, region information that corresponds to the user information that is present in the managed mapping information as a first response; and sending, in a second case where a second collation result of the collating indicates that the user information that corresponds to the user information specifying the user included in the region specifying request is not present in the managed mapping information, to the client terminal, mendacious region information as a second response.

* * * * *